(12) United States Patent
Boyd et al.

(10) Patent No.: US 7,717,270 B2
(45) Date of Patent: May 18, 2010

(54) END-OF-FAUCET FILTER

(76) Inventors: Brian Boyd, 4325 Silverview Ct., Fort Collins, CO (US) 80526; Michael P. Hoopis, 8 Royal Saint George, Newport Beach, CA (US) 92660

(*) Notice: Subject to any disclaimer, the term of this patent is extended or adjusted under 35 U.S.C. 154(b) by 0 days.

(21) Appl. No.: 12/018,909

(22) Filed: Jan. 24, 2008

(65) Prior Publication Data

US 2009/0134079 A1 May 28, 2009

Related U.S. Application Data

(62) Division of application No. 10/955,754, filed on Sep. 29, 2004, now Pat. No. 7,326,334.

(60) Provisional application No. 60/507,990, filed on Oct. 1, 2003, provisional application No. 60/583,699, filed on Jun. 28, 2004.

(51) Int. Cl.
*B01D 35/04* (2006.01)
(52) U.S. Cl. .................. 210/460; 210/423; 210/424
(58) Field of Classification Search .......... 210/446, 210/449, 460, 420, 422, 423, 424, 433.1
See application file for complete search history.

(56) References Cited

U.S. PATENT DOCUMENTS 5,017,286 A * 5/1991 Heiligman ............. 210/266
2004/0069695 A1* 4/2004 Isobe et al. ............. 210/91

FOREIGN PATENT DOCUMENTS

JP 11216464 A * 8/1999
WO WO 02055439 A1 * 7/2002

* cited by examiner

*Primary Examiner*—Terry K Cecil
(74) *Attorney, Agent, or Firm*—Ronald E. Smith; Smith & Hopen, P.A.

(57) ABSTRACT

Various embodiments of an end-of faucet filter assembly connectable with a faucet on a standard sink and having a plurality of outlets corresponding with selectable modes of operation are disclosed herein. One mode of operation provides unfiltered, aerated water dispenses from the filter assembly. A second mode of operation provides a pulsing jet spray, while a third mode of operation provides filtered water. One embodiment of the present invention also includes a connection assembly between the end-of-faucet filter and the faucet that utilizes a water-tight radial seal that allows the end-of-faucet filter to swing or rotate back and forth relative to the faucet without impairing the integrity of the seal. Other embodiments of the present invention also include a filter cartridge assembly configured to provide a user with an easy method of removing and installing the cartridge.

5 Claims, 31 Drawing Sheets

END-OF-FAUCET FILTER

CROSS-REFERENCE TO RELATED APPLICATIONS

This application is a divisional of U.S. Non-provisional patent application Ser. No. 10/955,754, entitled "End-of-Faucet Filter," filed Sep. 29, 2004 now U.S. Pat. No. 7,326,334 which claims priority to U.S. Provisional Patent Application Ser. No. 60/507,990, entitled "End-of-Faucet Filter," filed on Oct. 1, 2003, and U.S. Provisional Patent Application Ser. No. 60/583,699, entitled "End-of-Faucet Filter," filed on Jun. 28, 2004 now U.S. Ser. No. 12/018,909, which are hereby incorporated herein by reference in their entirety as though fully set forth.

BACKGROUND OF THE INVENTION a. Field of the Invention

This invention relates to water filters, and more particularly, to a filter apparatus including selectable filtered water, pulsating water, and aerated water output functions for dispensing water from a faucet.

b. Background Art

A variety of filter systems exist having various designs and configurations that filter water dispensed directly from a faucet or other tap. Some filter systems have a connection assembly including fittings and seals that allows a user to connect the filter systems directly to the end of a faucet. Further, some filter systems provide a replaceable filter cartridge. With such filter systems, once a filter has reached the end of its useful life, a user can remove the old filter and replace it with a new one. However, some of the aforementioned filter systems are relatively large and can be a nuisance to a user performing various activities in a sink that do not require filtered water, such as washing dishes. Often such filter systems do not provide the user with the ability to move or swing the filter system relative to the faucet to place the filter system in a more convenient location without compromising the seal between the filter system and the faucet. Further, many filter assemblies include complicated connection schemes that make it difficult for user to replace a filter.

Some filter systems also provide a knob or a switch that allows a user to selectively operate the filter system to dispense either filtered water or unfiltered water. Typically, once a user selects a mode of operation with the knob, the knob remains in the selected position until the user changes it. As such, sometimes the user inadvertently operates the filter system to dispense filtered water when it is not required to do so, which needlessly wastes the useful life of the filter. In addition, many filter systems only provide for filtered and unfiltered operation without any other modes of operation.

BRIEF SUMMARY OF THE INVENTION

One embodiment of the present invention takes the form of a filter apparatus connectable to a faucet and providing various modes of operation, an easily replaceable and relatively compact filter cartridge assembly, and/or a connection assembly that allows a user to move or swing the filter apparatus relative to the faucet without compromising the seal. More particularly, one embodiment of the present invention takes the form of an end-of-faucet filter connectable with a faucet on a standard sink and providing three modes of operation. A first mode provides unfiltered, aerated water dispensed from a first outlet. A second mode provides a jet spray from a second outlet. The second mode can also be configured to provide a pulsating jet spray from the second outlet. A third mode provides filtered water from a third outlet. The filter also includes a carbon filter block, which permits the filter to occupy a relatively small volume.

In one embodiment, a filter apparatus adapted to connect with a faucet includes a header assembly, which includes an inlet operative to accept a fluid flow; a first outlet operative to receive the fluid flow from the inlet; and a second outlet operative to receive the fluid flow from the inlet. The filter apparatus also includes a filter cartridge assembly operatively coupled to the header assembly. The filter cartridge is operative to receive the fluid flow from the inlet and transmit the fluid flow to at least on of the first and second outlets, further operative to convert the fluid flow into a filtered fluid flow. The filter apparatus further includes an actuator mechanism coupled with the header assembly and selectively operable to fluidly couple the inlet with the first outlet, further selectively operable to fluidly couple the inlet with the second outlet, and a turbine having at least one blade and operative to at least momentarily interrupt the fluid flow through the first outlet, creating a pulsed spray exiting the first outlet.

In another embodiment, a filter apparatus adapted to connect with a faucet includes a header assembly including an inlet operative to accept a fluid flow and a first outlet operative to receive the fluid flow from the inlet. The filter apparatus also includes a filter cartridge assembly operatively coupled to the header assembly, the filter cartridge operative to receive the fluid flow from the inlet and transmit the fluid flow to the first outlet, and a filter disposed within the filter cartridge assembly, the filter having a volume no greater than about 6.88 cubic inches.

In yet another embodiment, a water filter apparatus includes: a header assembly having an inlet and at least one outlet; a filter cartridge assembly operatively coupled to the header assembly; and an actuator mechanism operatively coupled to the header assembly and selectively operable to place the filter apparatus in one of at least three modes of operation.

In still another embodiment, a water filter apparatus includes: a header assembly having and inlet and at least one outlet; a filter cartridge assembly operatively coupled to the header assembly; and a connection assembly adapted to connect the inlet with a faucet and including a water-tight seal between the inlet and the faucet. The connection assembly allows the header assembly to pivot about the faucet without compromising the water-tight seal.

In still another embodiment, a filter apparatus adapted to connect with a faucet includes: a header assembly having an inlet and three outlets; a means for filtering operatively coupled with the header assembly; and a means for selectively fluidly coupling the inlet with any one of the three outlets.

In still another embodiment, a filter apparatus, includes: an inlet operative to receive a water flow; a first valve operative to accept the water flow from the inlet; a second valve operatively connected to the inlet; and an actuator mechanism operative to divert the water flow to the first valve by occupying a first position, further operative to divert the water flow to the second valve by occupying a second position; and a filter operative to receive the water flow from the first valve. After occupying one of the first and second positions for a period of time, the actuator mechanism occupies a third position.

The features, utilities, and advantages of various embodiments of the invention will be apparent from the following description of embodiments of the invention as illustrated in the accompanying drawings and defined in the appended claims.

DETAILED DESCRIPTION OF THE INVENTION

One embodiment of the present invention takes the form of an end-of-faucet filter connectable with a faucet on a standard sink and having a plurality of outlets corresponding with selectable modes of operation. Another embodiment of the present invention includes a connection assembly between the end-of-faucet filter and the faucet that utilizes a watertight radial seal allowing the end-of-faucet filter to swing or rotate back and forth relative to the faucet without impairing the integrity of the seal. Other embodiments of the present invention include a filter cartridge assembly configured to provide a user with an easy method of removing and installing the cartridge. While the present invention is discussed below with reference to three modes of operation, it is to be appreciated that other embodiments of can include more or less than three modes of operation. In addition, each of these modes may be combined in any combination into a single outlet.

Figure 1:
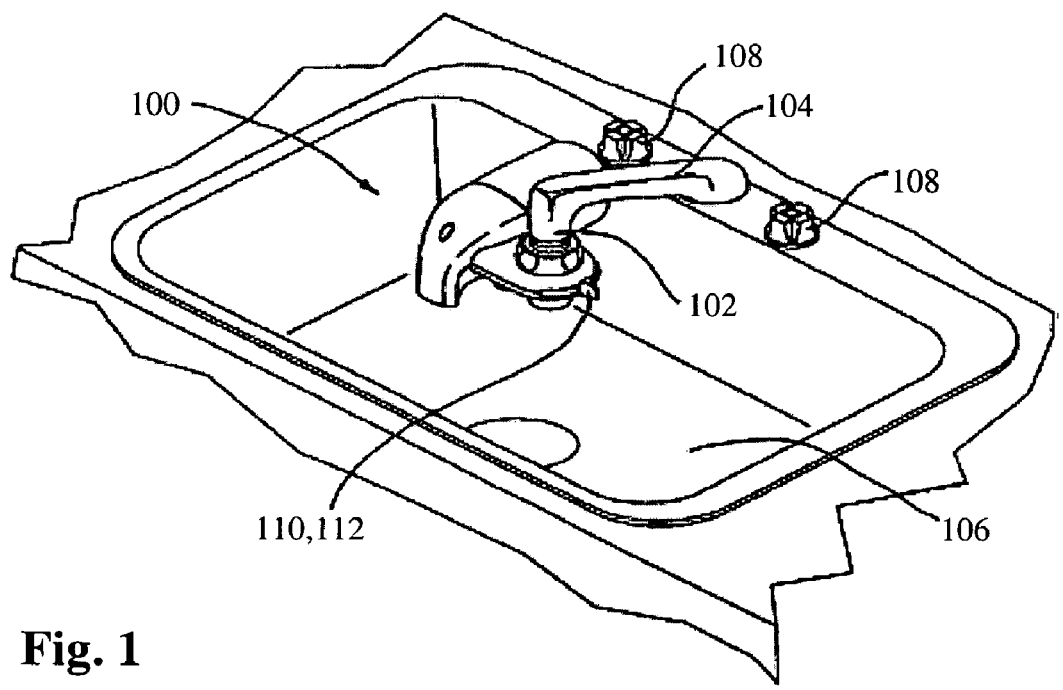
FIG. 1 is an isometric view of an end-of-faucet filter connected with a faucet.
Figure 2:
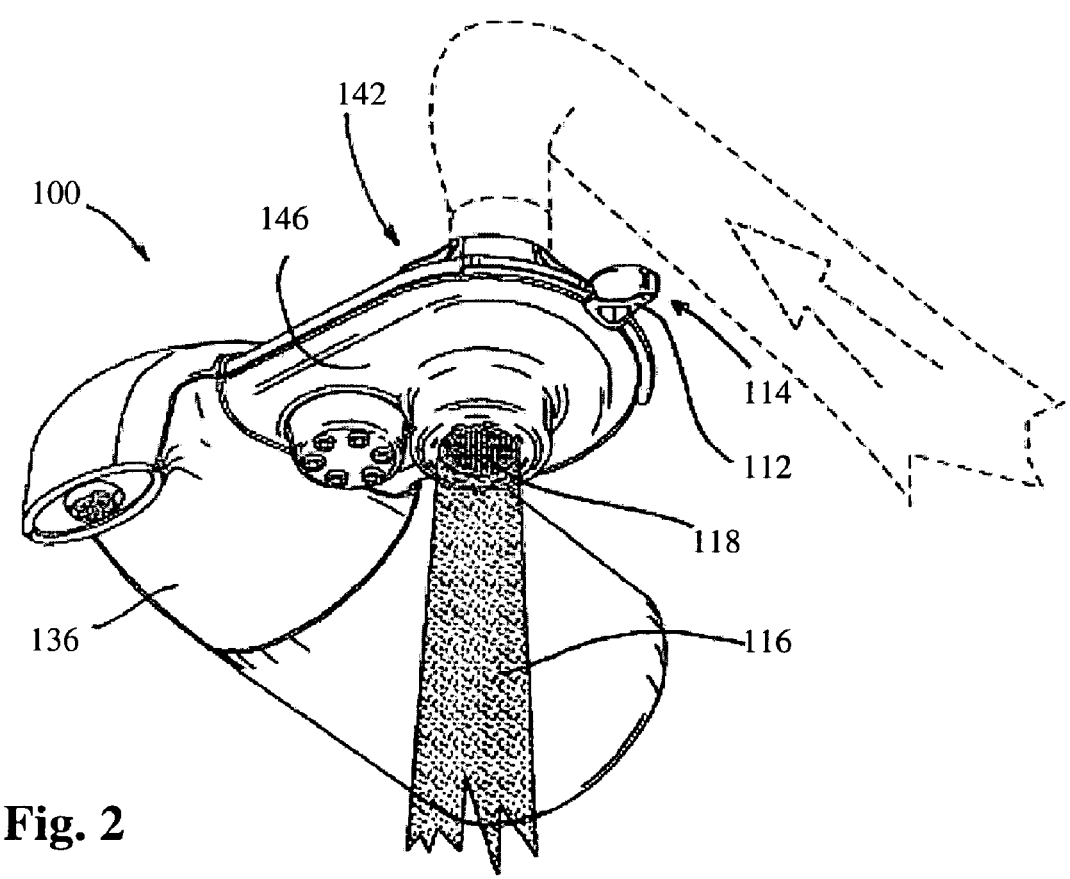
FIG. 2 is a bottom isometric view of the end-of-faucet filter in a first mode of operation.
Figure 3:
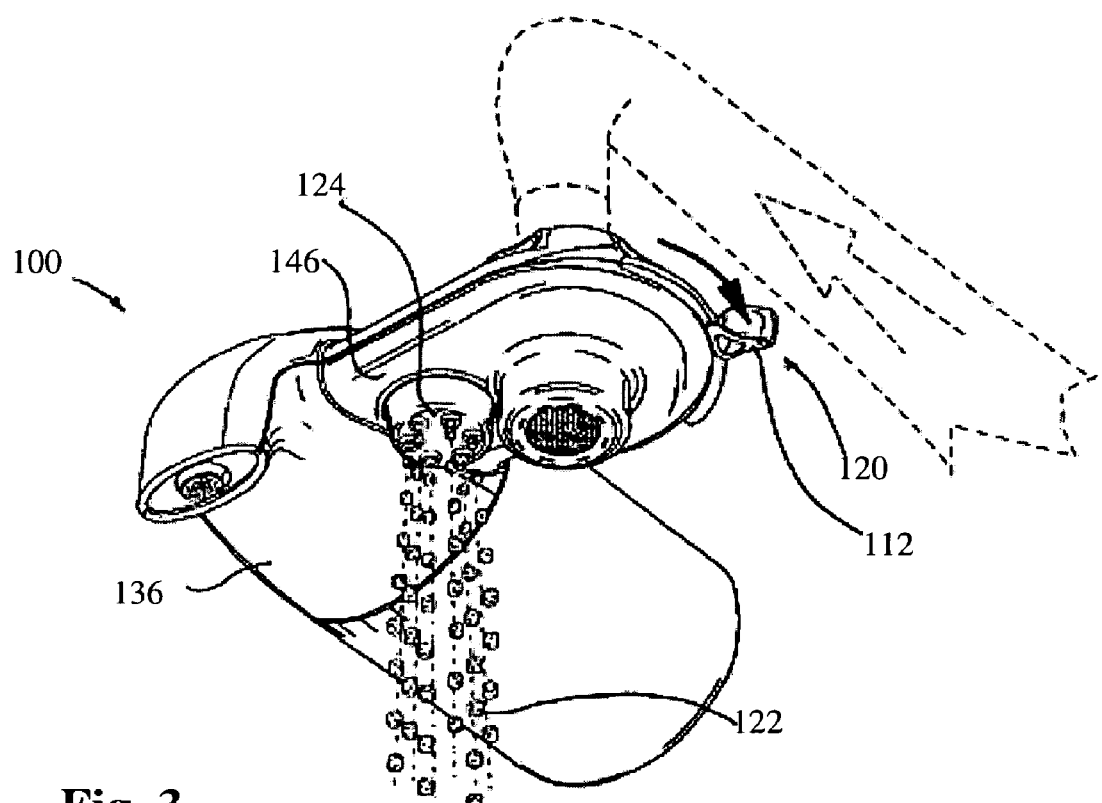
FIG. 3 is a bottom isometric view of the end-of-faucet filter in a second mode of operation.
Figure 4:
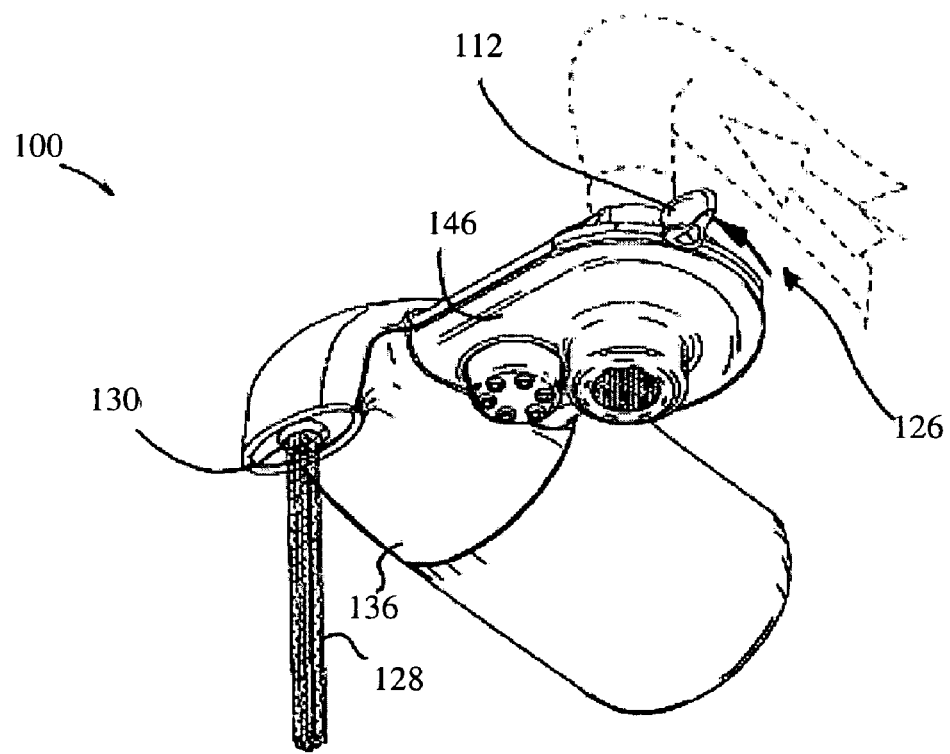
FIG. 4 is a bottom isometric view of the end-of-faucet filter in a third mode of operation.
Figure 5:
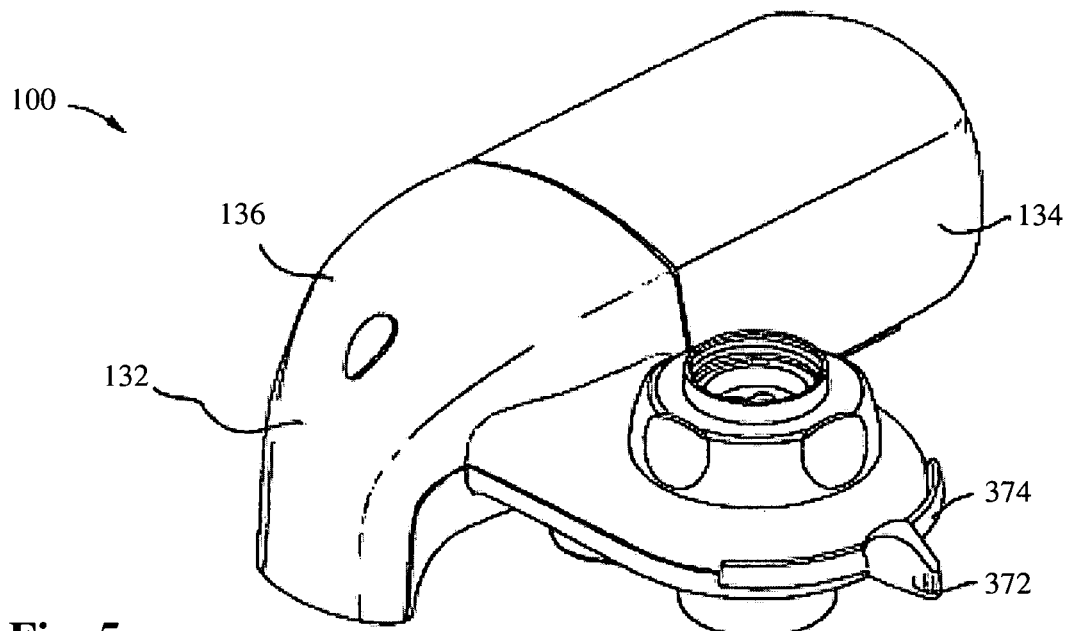
FIG. 5 is a right isometric view of the end-of-faucet filter shown in FIG. 1 from a top front perspective.

FIG. 1 shows an end-of-faucet filter 100, according to one embodiment of the present invention, connected with a discharge end 102 of a faucet 104 suspended over a sink 106. When a user opens a valve 108 on the sink, such as a hot or cold water valve, water flows into and through the faucet and discharges into the end-of-faucet filter. The water then flows through the end-of-faucet filter and is discharged from an outlet on the end-of-faucet filter. The embodiment shown in FIG. 1 includes three different outlets that correspond with three different modes of operation, as illustrated in FIGS. 2-4. The end-of-faucet filter further includes an actuator mechanism 110 having an actuator switch 112 that allows a user to select a desired mode of operation. As discussed in more detail below, movement of the actuator switch 112 manipulates the positions of one or more valves within the end-of-faucet filter, which, in turn, affects the flow path of the water through the end-of-faucet filter. In a first mode of operation shown in FIG. 2, the actuator switch 112 is located in a mid-position 114, and unfiltered, aerated water 116 is dispensed from the end-of-faucet filter 100 through a first outlet 118. FIG. 3 shows a second mode of operation, wherein the actuator switch 112 is located in a rearward position 120, corresponding to a jet spray discharge 122 from the end-of-faucet filter 100 through a second outlet 124. As discussed in more detail below, the end-of-faucet filter can also be configured to provide a pulsating jet spray from the second outlet. A third mode of operation is shown in FIG. 4, wherein the actuator switch 112 is located in a forward position 126, and filtered water 128 is correspondingly discharged from the end-of-faucet filter 100 through a third outlet 130.

The external features and outer housing 132 of the end-of-faucet filter 100 are shown in FIGS. 1-8. As shown in FIGS. 5-8, the end-of-faucet filter 100 includes a filter cartridge assembly 134 removably connected with a header assembly 136. As discussed in more detail below, the filter cartridge assembly 134 is both mechanically and fluidly coupled with the header assembly 136. The header assembly 136 is adapted to connect with the faucet of a standard sink by engaging the threading of the faucet outlet exposed upon the removal of an end cap from the faucet. As discussed in more detail below with reference to FIGS. 9A-9E, the header assembly also includes a flow path assembly 138 directing water from a fluid inlet to the three outlets. Valves adapted to engage the manifold are used to direct water to various ducts in the flow path assembly. In some embodiments of the present invention, the user can also manipulate the valves through the actuator mechanism 110.

FIGS. 9A-9E are an exploded isometric view of the header assembly 136 of the end-of-faucet filter 100 showing its various components in detail. As used herein, the terms front, back, left, right, top, bottom, upper, and lower indicate positions and portions of components of the end-of-faucet filter relative to the views defined above in the description of FIGS. 1-8. The header assembly 136 includes a housing 140, a faucet attachment portion 142, a filter attachment portion 144, the flow path assembly 138, and three outlets. Viewing the header assembly from the front, the faucet attachment portion 142 is on the right and the filter attachment portion 144 is on the left. It is to be appreciated that the orientation of these portions as shown in the figures is merely a matter of design choice and that these portions can be reversed or otherwise modified. As shown in FIGS. 2-4, the first outlet 118, the second outlet 124, and the third outlet 130 are located on a bottom side 146 of the header assembly 136. Viewing the header assembly from the bottom, the first outlet 118 is located on the right, the third outlet 130 is located on the left, and the second outlet 124 is located between the first and third outlets. As discussed in more detail below, the flow path assembly includes various components, such as the manifold, that are located inside the housing of the header assembly.

Figure 9A:
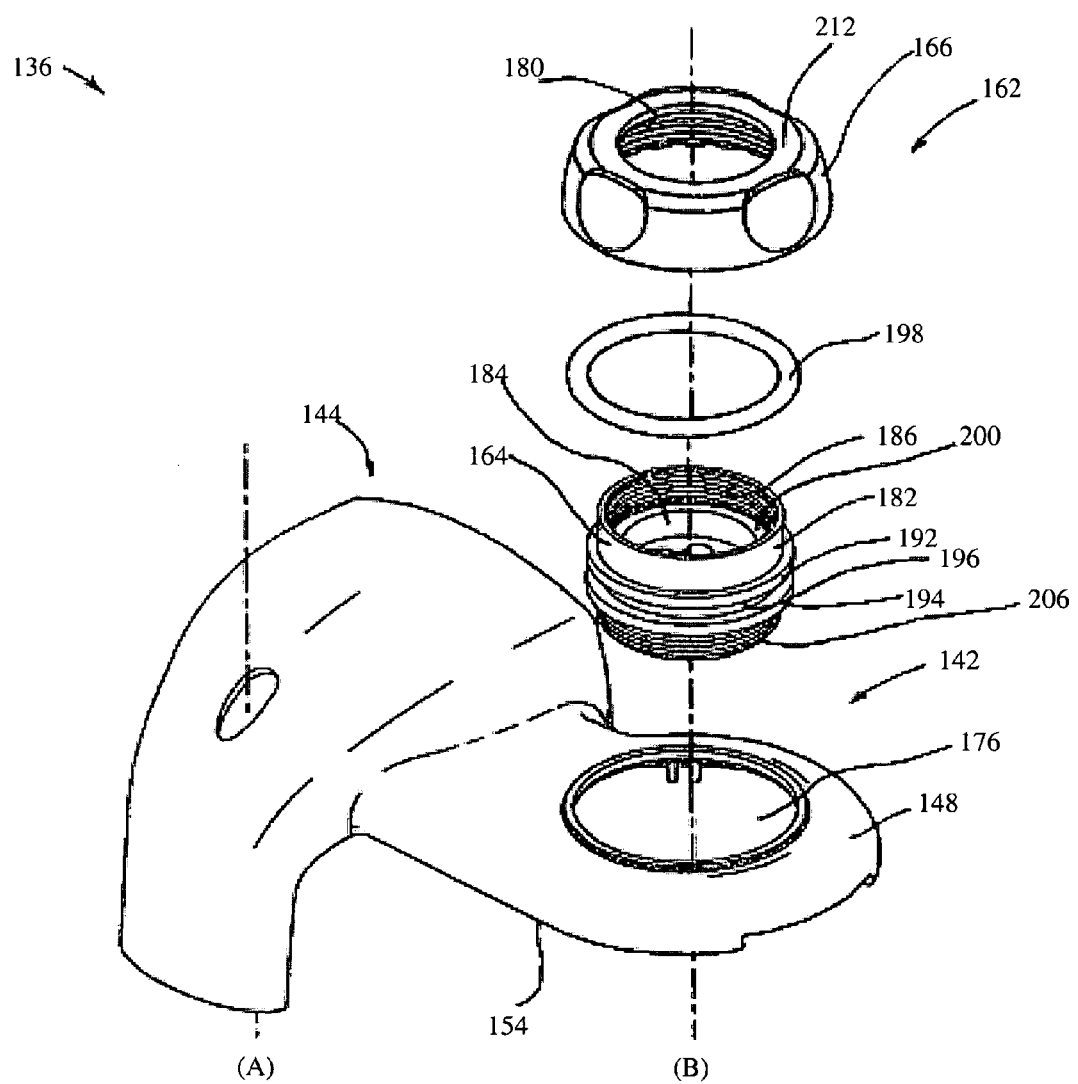
FIGS. 9A-9E are an exploded isometric view of the header assembly of the end-of-faucet filter according to one embodiment of the present invention.
Figure 9B:
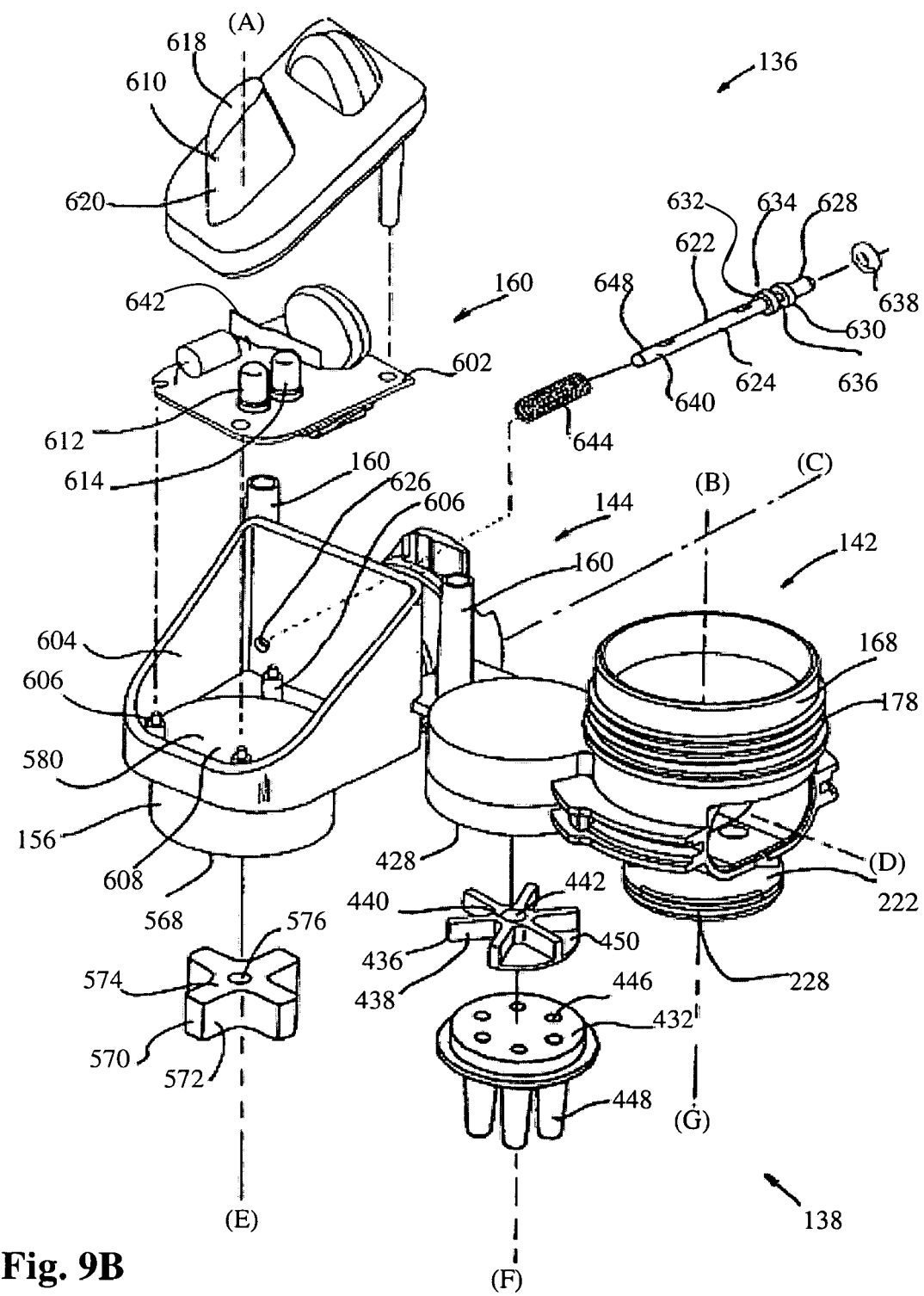
Figure 9C:
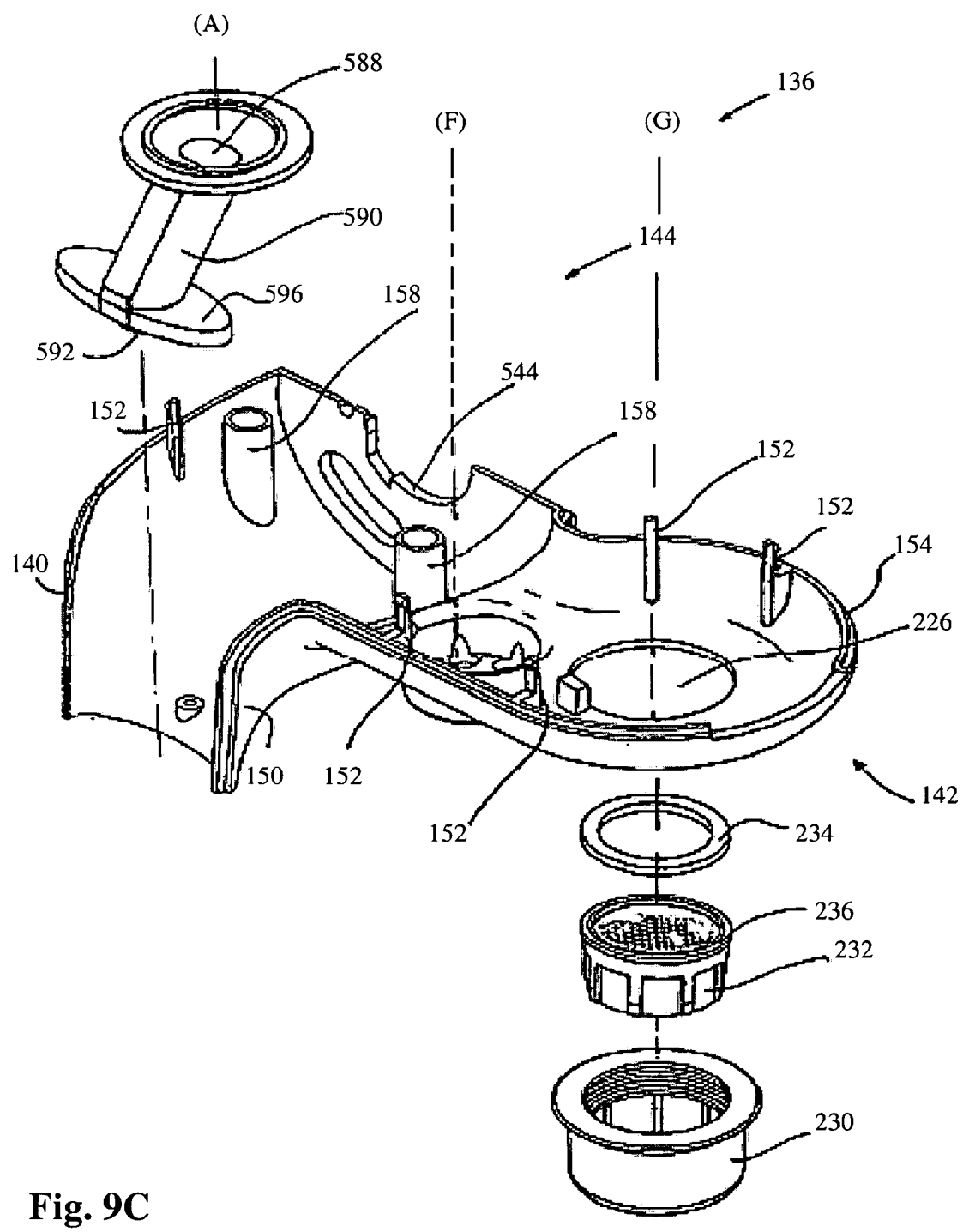

As shown in FIGS. 9A-9C, the housing 140 of the header assembly 136 is defined by an upper header housing 148 and a lower housing 150 that are releasably, but fixedly, attached together with housing clasps 152 located about a perimeter interface 154 between the upper and lower housings. For reference, the upper and lower housings partially encapsulate a manifold 156. The upper housing 148 and the lower housing 150 also each include two receptacle posts 158 adapted to receive opposing alignment posts 160 protruding from the manifold 156. The alignment posts 160 are received within the receptacle posts 158 and act to secure the manifold 156 in place between the upper and lower housings as well as align the upper housing with the lower housing.

The faucet attachment portion 142 includes a faucet connection assembly 162 that releasably connects the end-of-faucet filter 100 with the faucet. As shown in FIGS. 9A-9B, the faucet connection assembly 162 includes components that are located internally and externally with respect to the housing 140 of the header assembly 136. More particularly, the faucet connection assembly 162 includes a nipple 164 and collar 166 coupled with an inlet cup 168 that is integral with the manifold 156. As shown in FIGS. 10A-10E and 11B, the inlet cup 168 is substantially cylindrically-shaped and includes a bottom portion 170 with an internal base 172 located inside the header housing 140 and has a sidewall 174 extending upward from the bottom portion 170 through an upper aperture 176 in the upper housing. The sidewall 174 of the inlet cup 168 includes external threading 178 adapted to engage internal threading 180 on the collar 166, as discussed in more detail below.

Referring to FIGS. 9A-9B and 11B-11C, the nipple 164 includes a substantially cylindrically-shaped sidewall 182 defining a lumen 184 having internal threading 186 located on the sidewall 182 near a top end portion 188 of the nipple. The internal threading 186 located on the top end portion 188 of the nipple 164 is adapted to engage an externally threaded outlet 190 of the faucet 104. It is to be appreciated that various embodiments of the present invention can utilize different nipples having various types of the threading adaptable to various kinds of faucet outlets. For example, one embodiment of the present invention includes a nipple adapted to threadedly engage a standard faucet such as those found in most consumer or commercial sinks. Upper 192 and lower annular flanges 194 protrude outwardly from the sidewall 182 of the nipple 164, defining a channel 196 therebetween adapted to retain an O-ring 198 that fits circumferentially around the nipple. As discussed in more detail below, the O-ring 198 engages the inside of the sidewall 174 of the inlet cup 168 to create a water-tight seal between the nipple 164 and the inlet cup 168.

Figure 10A:
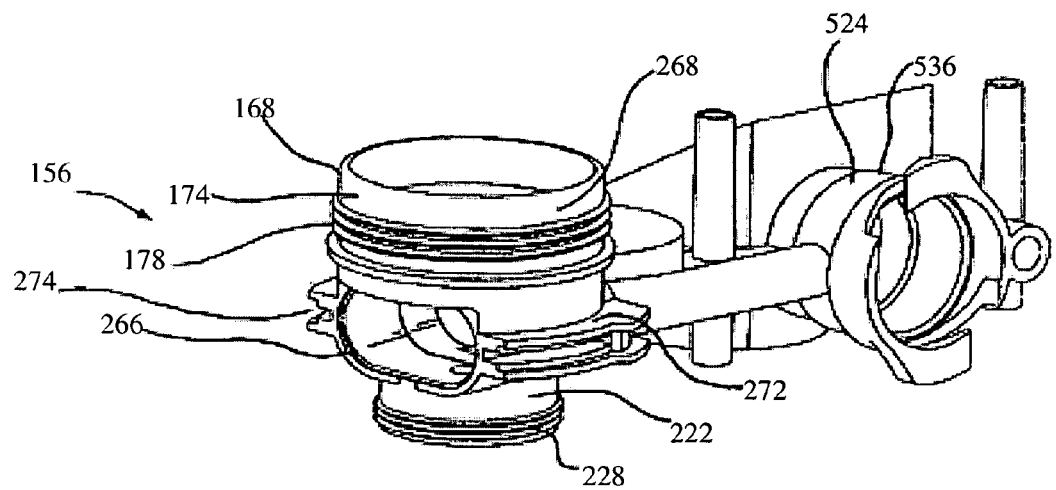
FIG. 10A is a right rear isometric view of a manifold.
Figure 10B:
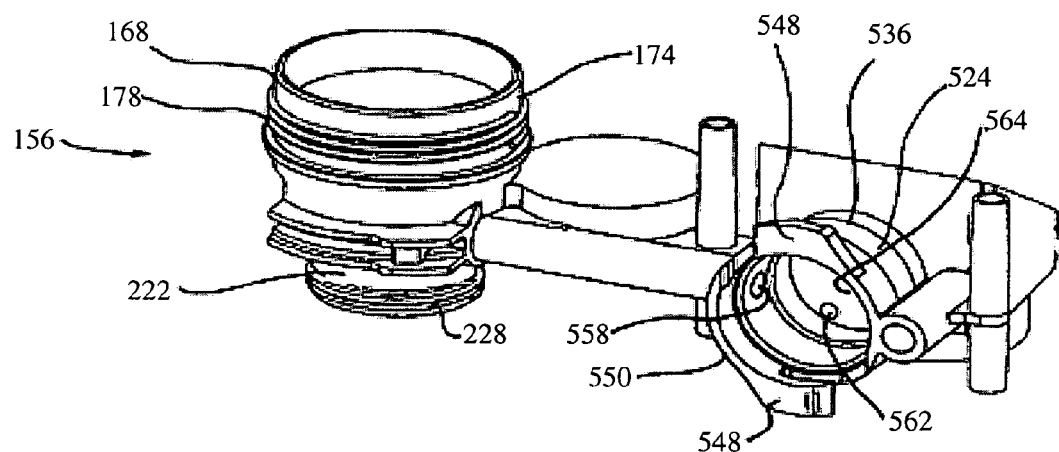
FIG. 10B is a left rear isometric view of the manifold.
Figure 10C:
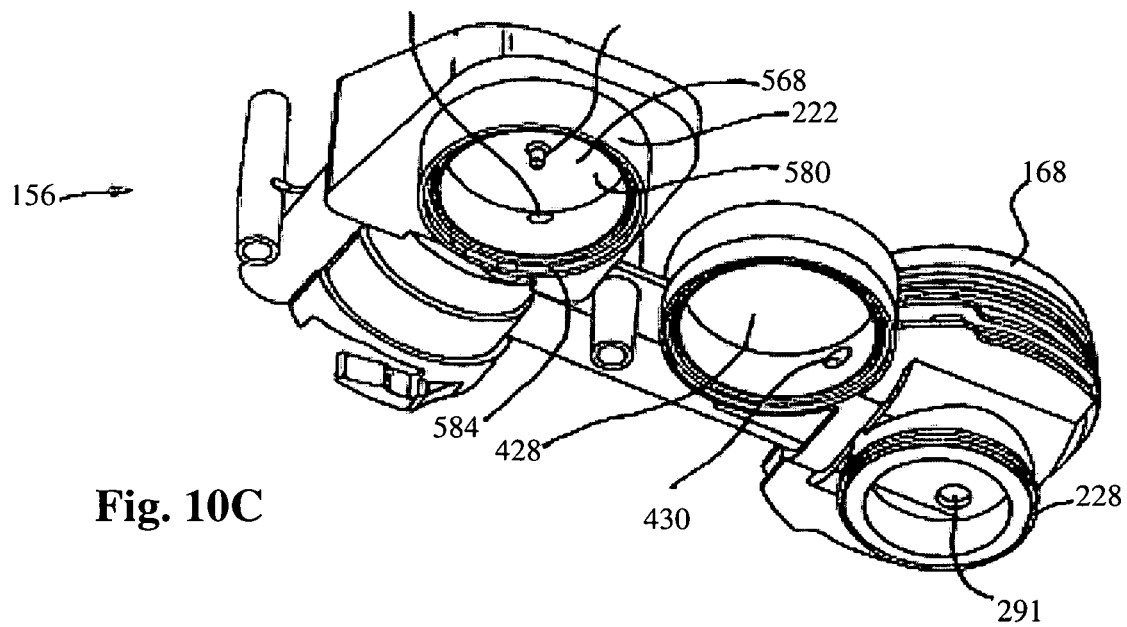
FIG. 10C is a bottom right isometric view of the manifold.
Figure 10D:
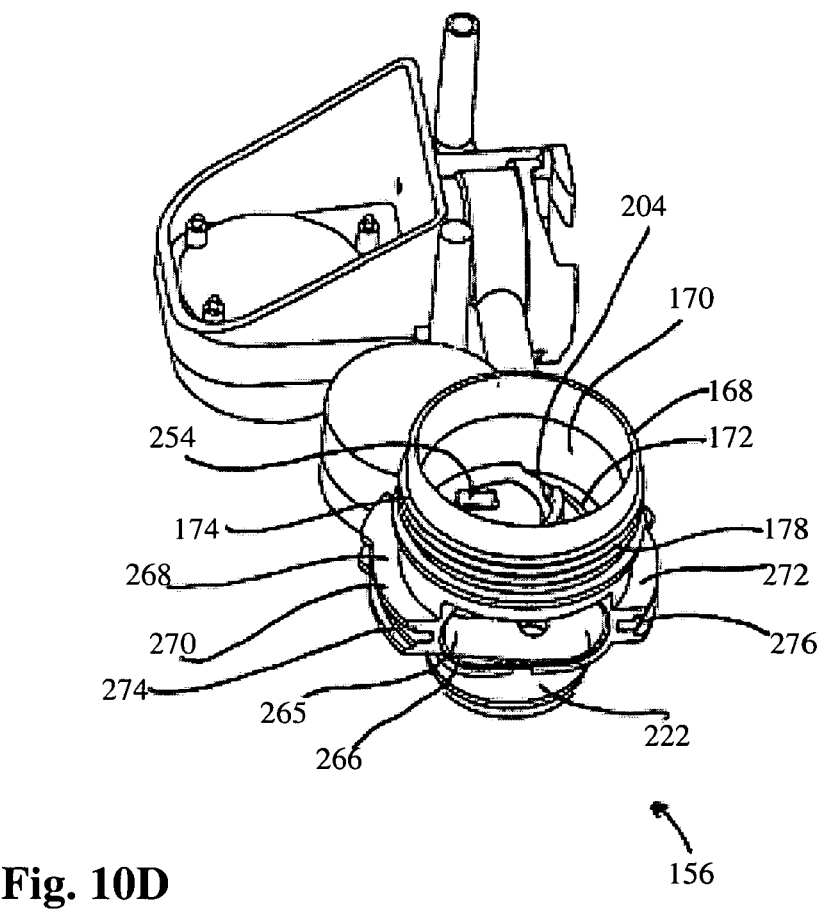
FIG. 10D is a right top isometric view of the manifold.
Figure 10E:
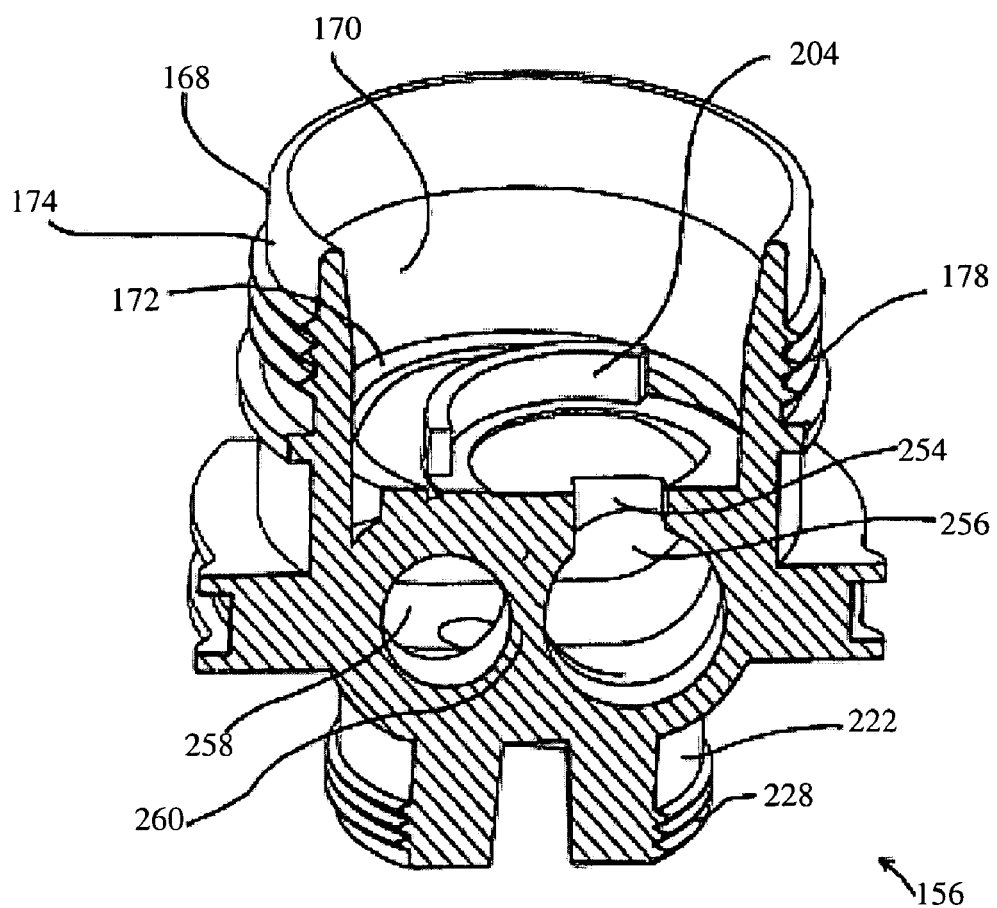
FIG. 10E is an isometric cross-sectional view of the inlet cup of the manifold.
Figure 11:
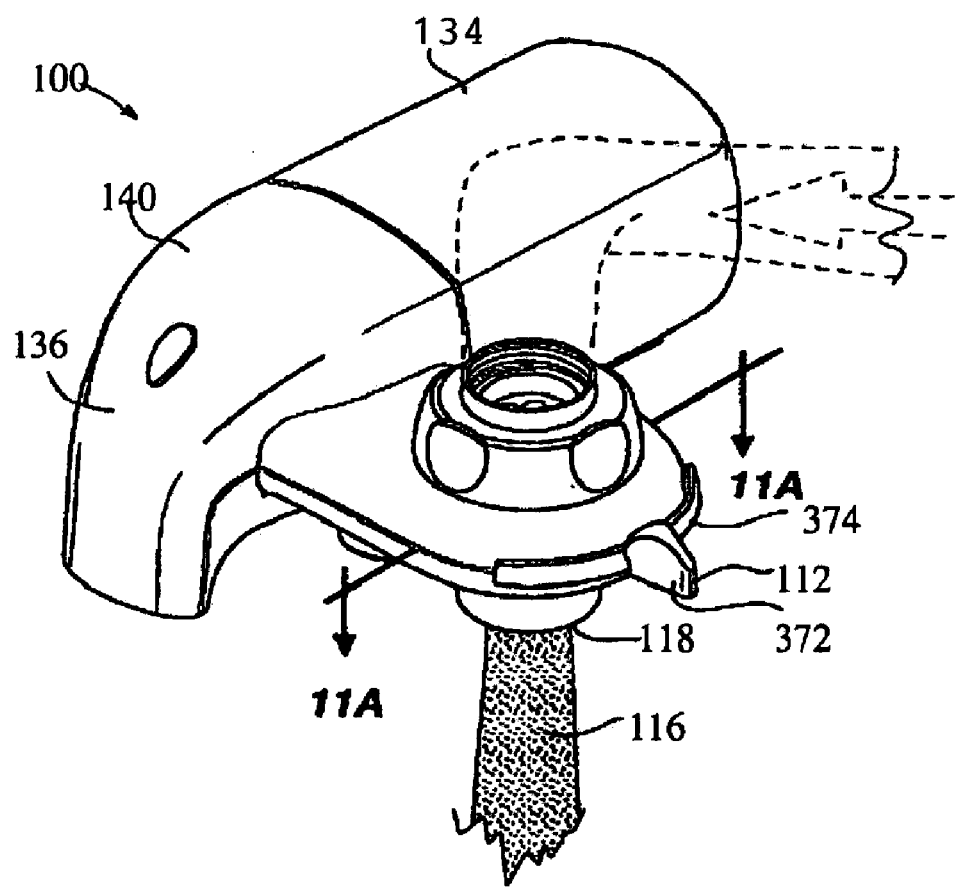
FIG. 11 is a top isometric view of the end-of-faucet filter in a first mode of operation.
Figure 11A:
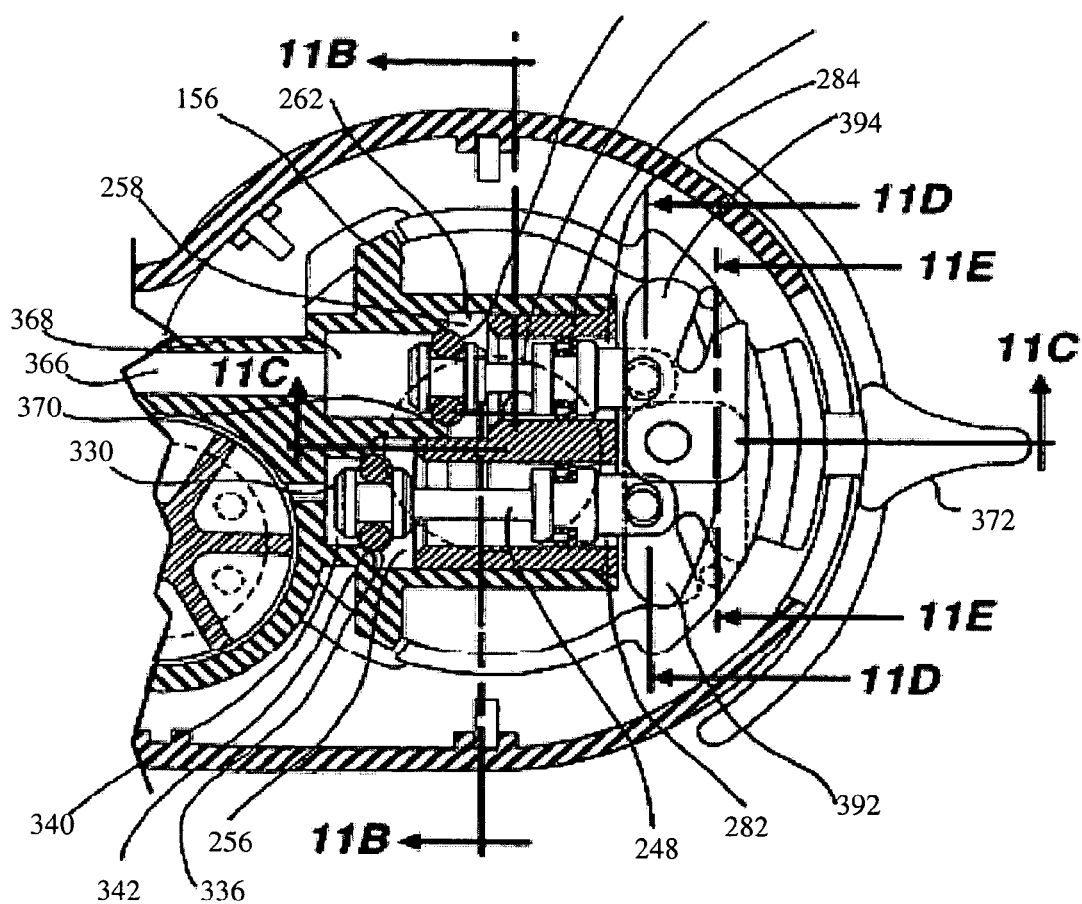
FIG. 11A is a cross-sectional view of the end-of-faucet filter depicted in FIG. 11, taken along line 11A-11A.
Figure 11B:
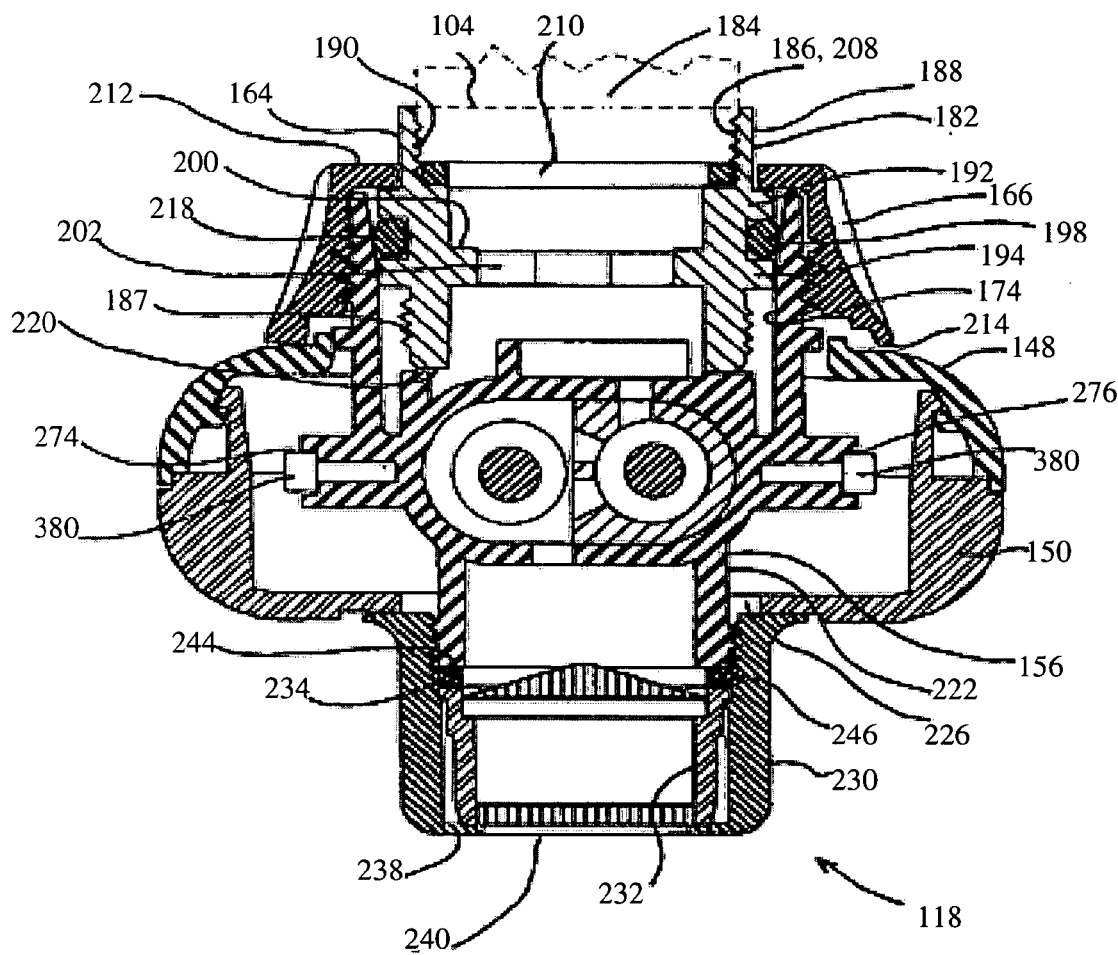
FIG. 11B is a cross-sectional view of the end-of-faucet filter depicted in FIG. 11A, taken along line 11B-11B.
Figure 11C:
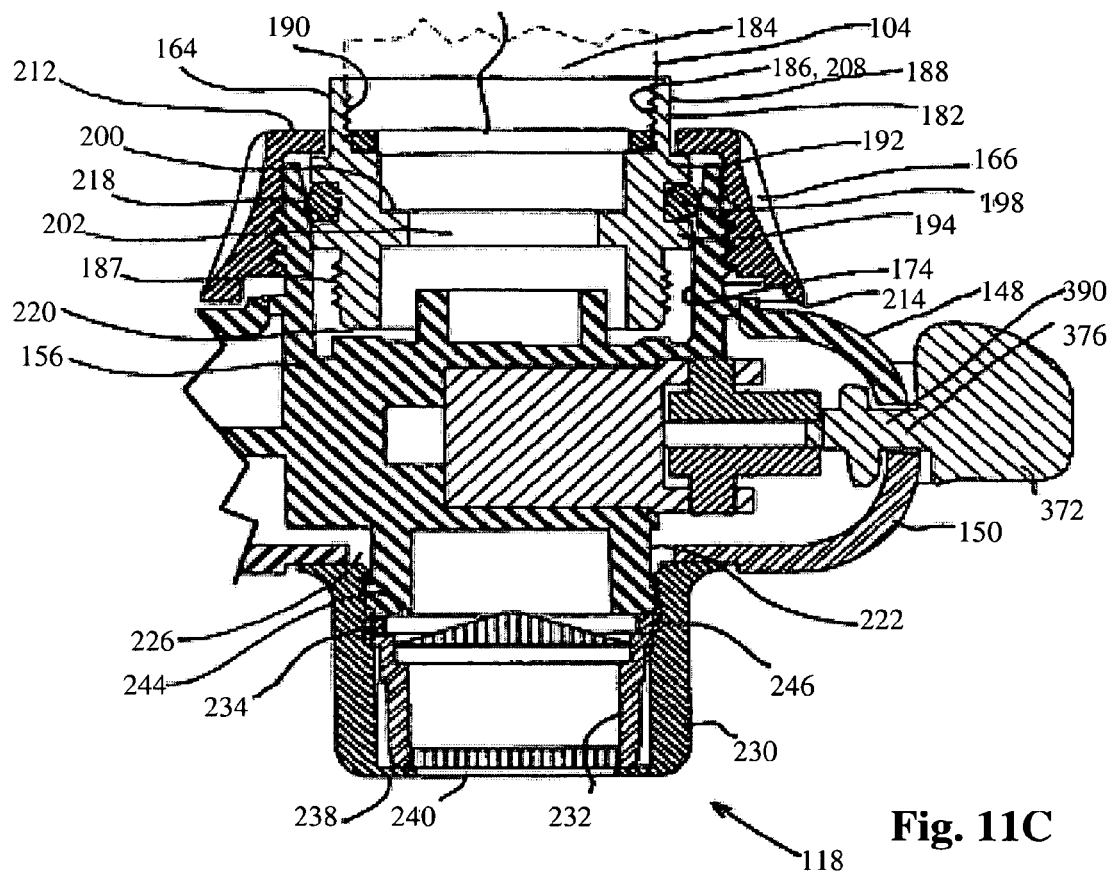
FIG. 11C is a cross-sectional view of the end-of-faucet filter depicted in FIG. 11A, taken along line 11C-11C.

As shown in FIGS. 9A and 11B-11C, a flange 200, located generally medially with respect to the length of the nipple 164, extends radially inward from the sidewall 182 of the nipple 164 and defines a lobed aperture 202 within the lumen 184 of the nipple. The lobed aperture 202 can be configured to receive a specially shaped wrench or other tool for tightening the nipple onto the faucet outlet. It is to be appreciated that having the lobed aperture inside the lumen of the nipple is merely a design choice; other embodiments of the present invention can include apertures having other shapes. Other embodiments do not have an aperture located inside the nipple, and, as such, the nipple defines a uniform lumen without a medial flange. Still, other embodiments include a raised ridge 204, as shown in FIGS. 10D-10E, formed within the inlet cup 168 adapted to support a screen for removing particulates from the water. Such a screen can be located within a lower end portion 206 of the nipple 164 below the lobed aperture 202.

To connect the end-of-faucet filter 100 with the faucet, an end cap (not shown) on the faucet outlet 190 is first removed, which exposes external threading 208 on the faucet outlet. Referring to FIGS. 11B-11C, the user then places the O-ring 198 on the nipple 164 between the upper flange 192 and the lower annular flange 194. Next, the user places the collar 166 onto the nipple 164 such that the upper end portion 188 of the nipple 164 extends through an aperture 210 defined by a rim 212 on the top of the collar 166. The collar slides down the upper portion 188 of the nipple 164 until the rim 210 engages the upper annular flange 192 on the nipple. Next, the nipple 164 is screwed onto the faucet outlet 190 by engaging the internal threading 186 on the top end portion of the nipple 164 with the eternal threading 208 on the faucet outlet 190. If the nipple 164 includes the lobed aperture 202 discussed above, the nipple can be further tightened onto the faucet with a special tool or wrench adapted to engage the lobed aperture. Next, the header housing 140 is moved into position under the nipple 164 such that the lower end portion 206 of the nipple 164, including the O-ring 198, is received within the inlet cup 168 of the manifold 156. The collar 166 is then screwed onto the inlet cup by engaging the internal threading 180 on the collar 166 with the external threading 178 on the inlet cup. A bottom edge 214 of the collar 166 has a diameter slightly larger than a diameter of the upper aperture 176 in the upper housing 148. As such, when the collar 166 and the inlet cup 168 are sufficiently tightened together, the bottom edge 214 of the collar 166 sits flush against the upper housing 148 and interfaces with an upper surface 216 of the upper housing 148.

When the collar 166 is threadedly engaged with the inlet cup 168, the nipple 164 is retained within the inlet cup by compression. As mentioned above, the O-ring 198 on the nipple 164 engages the inside of the sidewall 174 of the inlet cup 168 to create a water-tight seal 218 between the nipple and the inlet cup, as shown in FIGS. 11B-11C. As such, the seal 218 between the inlet cup and nipple is formed by radial pressure between the nipple sidewall 182, the O-ring 198, and the inlet cup sidewall 174. This radial seal configuration can be contrasted with known designs that use a washer and axial or vertical compression between a faucet outlet and a filter assembly to achieve a water-tight seal. The advantage of the radial seal 218 of the present invention is that the end-of-faucet filter can swing or rotate back and forth about the connection with the faucet outlet without impairing the water-tight seal or otherwise unscrewing the connection between the faucet outlet and the end-of-faucet filter. More particularly, the upper annular flange 192 on the nipple 164 and the rim 212 of the collar 166 act as opposing bearing surfaces. In addition, a bottom edge 220 of the nipple 164 and the internal base 172 of the inlet cup 168 act as opposing bearing surfaces. As such, the end-of-faucet filter may rotate on these bearing surfaces without loosening the engagement between the nipple and the faucet outlet or otherwise impairing the water-tight seal provided by the circumferential O-ring on the nipple.

It is to be appreciated that the present invention is not limited to being connected with an externally threaded faucet. For example, the present invention can be configured to connect with an internally threaded faucet. As shown in FIG. 11B, the lower end portion the nipple 164 includes external threading 187. As such, the nipple shown in FIG. 11B can be turned upside down with the top end portion 188 of the nipple placed inside the inlet cup 186 so that the external threading 187 is exposed to engage internal threading on the faucet. The end-of-faucet filter is otherwise connected with the internally threaded faucet in the same manner as described above with reference to the externally threaded faucet.

As previously mentioned, the header assembly 136 includes three outlets. The first outlet 118 is describe below with reference to FIGS. 2, 9B-9C, and 11B-11C, while the second outlet 124 and the third outlet 130 are described later in conjunction with associated flow path descriptions. As shown in FIG. 2, the first outlet 118 is located on the bottom right side of the faucet attachment portion 142 and provides a discharge of aerated water 116 from the end-of-faucet filter 100. More particularly shown in FIGS. 9B-9C and 11B-11C, the first outlet 118 includes a substantially cylindrically-shaped outlet fitting 222 formed integrally with the manifold 156 on the bottom side of the manifold in axial alignment with the inlet cup 168. When the upper housing 148 is engaged with the lower housing 150, a sidewall 224 of the outlet fitting 222 protrudes through a lower aperture 226 located in the lower housing 150 of the header assembly 136. Although the lower aperture 226 is shown as being axially aligned with the upper aperture 176 in the upper housing 148, it need not be. External threading 228 on the outlet fitting sidewall 224 is adapted to engage an internally threaded outlet cup 230. As such, the outlet cup 230 screws onto the outlet fitting 222 and sits flush against the bottom of the lower housing 150. As shown in FIG. 9C, the outlet cup 230 is adapted to contain an aerator 232. Before connecting the outlet cup 230 with the outlet fitting 222, a washer 234 is placed upon a top rim 236 of the aerator 232. As shown in FIGS. 11B-11C, when the outlet cup 230 is screwed onto the outlet fitting 222, a rim 238 defining an outlet aperture 240 on the bottom of the outlet cup 230 seats against a bottom end portion 242 of the aerator 232 and compresses the aerator 232 and washer 234 against a bottom edge 244 of the sidewall 224 of the outlet fitting 222. As such, compression of the washer creates a water-tight seal 246 between the aerator and the sidewall of the outlet fitting.

As previously mentioned, the flow path assembly 138 is located primarily within the housing 140 of the header assembly 136. As shown in FIGS. 9B, 9D, and 11-11A, the flow path assembly 138 includes two valves, referred to herein as a jet valve 248 and a filter valve 250, located partially within a valve body 252, which, in turn, are inserted into the manifold 156. As discussed in more detail below, the positions of the valves relative to manifold and valve body act to direct water flow through various ducts located within the valve body and manifold to one of the three outlets in the header assembly. As previously mentioned, a user can manipulate the positions of the valves through the actuator mechanism.

As shown in particular in FIGS. 10D-10E, an inlet port 254 is formed in the base 172 of the inlet cup 168 of the manifold 156, providing a passageway for water from the inlet cup 168 to a first manifold chamber 256 formed within the manifold. The first manifold chamber 256 is generally separated from a second manifold chamber 258 by a medial wall 260. As discussed in more detail below, the first manifold chamber 256 houses a portion of the jet valve 248, and the second manifold chamber 258 houses a portion of the filter valve 250. The manifold 156 also includes a manifold cavity 262 located between the inlet cup 168 and the outlet fitting 222 and is adapted to receive the valve body 252. As discussed in more detail below, when the valve body 252 is inserted into the manifold cavity 262, each of the first manifold chamber 256 and the second manifold chamber 258 abut a left end portion 264 of the valve body 252. Referring to FIGS. 10A and 10D, a manifold cavity flange 266 adapted to engage the valve body 252 is also located on a right end portion 268 of the manifold 156. Further, a front pair snap collar flanges 270 and a rear pair of snap collar flanges 272 are formed on the front and rear of the right end portion 268 of the manifold 156. The front snap collar flanges 270 and the rear snap collar flanges 272 form front 274 and rear snap collar channels 276, respectively therebetween. As discussed in more detail below, the snap collar channels are adapted to engage the actuator mechanism.

As shown in FIGS. 9D and 12A-12E, the valve body 252 includes a right cap portion 278 connected with a main body portion 280. The main body portion 280 defines two tubular passages, referred to herein as a jet valve lumen 282 and a filter valve lumen 284. An aperture in a sidewall 286 of the valve body 252 defining the jet valve lumen 282 further defines a jet valve port 288. A partial rim band 290 is thereby formed by the jet valve port 288 in the sidewall 286 of the valve body 252. A valve strut 292 divides the jet valve port 288 medially and provides structural support to the partial rim band 290 of the valve body otherwise separated by the jet valve port 288. An aperture in a sidewall 287 of the valve body 252 defining the filter valve lumen 284 further defines a filter valve port 289, which is in fluid communication with an aerator port 291 that feeds the outer fitting 222 on the bottom side of the manifold. The jet valve lumen 282 and the filter valve lumen 284 also include angled mating surfaces (294, 296) located on left end portions of the jet and filter valve lumen. As discussed in more detail below, the angled mating surfaces are adapted to interface with O-rings on the jet valve and the filter valve. The right cap portion 278 of the valve body 252 includes two apertures 298 aligned with and having the same diameter as the jet valve lumen 282 and the filter valve lumen 284. The outer circumference of the right cap portion 278 is slightly larger than the outer circumference of the main body portion 280 so as to define a valve flange 300. The valve flange 300 is adapted to engage the manifold cavity 262 on the manifold 156. Therefore, when the valve body 252 is inserted into the manifold cavity 262, the valve flange 300 seats against the manifold cavity flange 266 on the manifold 156 to create a sealed interface. In some embodiments of the present invention, the interface between the valve flange and the manifold cavity flange is ultrasonically welded to ensure a water-tight seal. The right cap portion also includes an upper valve tab 302 and a lower valve tab 304, each having a vertically oriented aperture 306,308 adapted to interface with the actuator mechanism 110, as discussed in more detail below.

As shown in FIGS. 11A and 12A-12E, when the valve body 252 is positioned within the manifold cavity 262, the jet valve lumen 282 extends axially further into the manifold cavity than the filter valve lumen 284. Further, the first manifold chamber 256 in the manifold cavity 262 is located adjacent to a left end portion 310 of the jet valve lumen 282, and the second manifold chamber 258 is located adjacent to a left end portion 312 the filter valve lumen 284. The medial wall 260 that separates the first manifold chamber 256 and the second manifold chamber 258 extends to cover the partial rim band 290 on the valve body 252, but does not extend to cover the jet valve port 288. As such, a manifold duct 314 is thereby formed in the area between the medial wall 260 and the valve body 252. The manifold duct 314 provides fluid communication between the jet valve port 288 and the second manifold chamber 258.

Figure 9D:
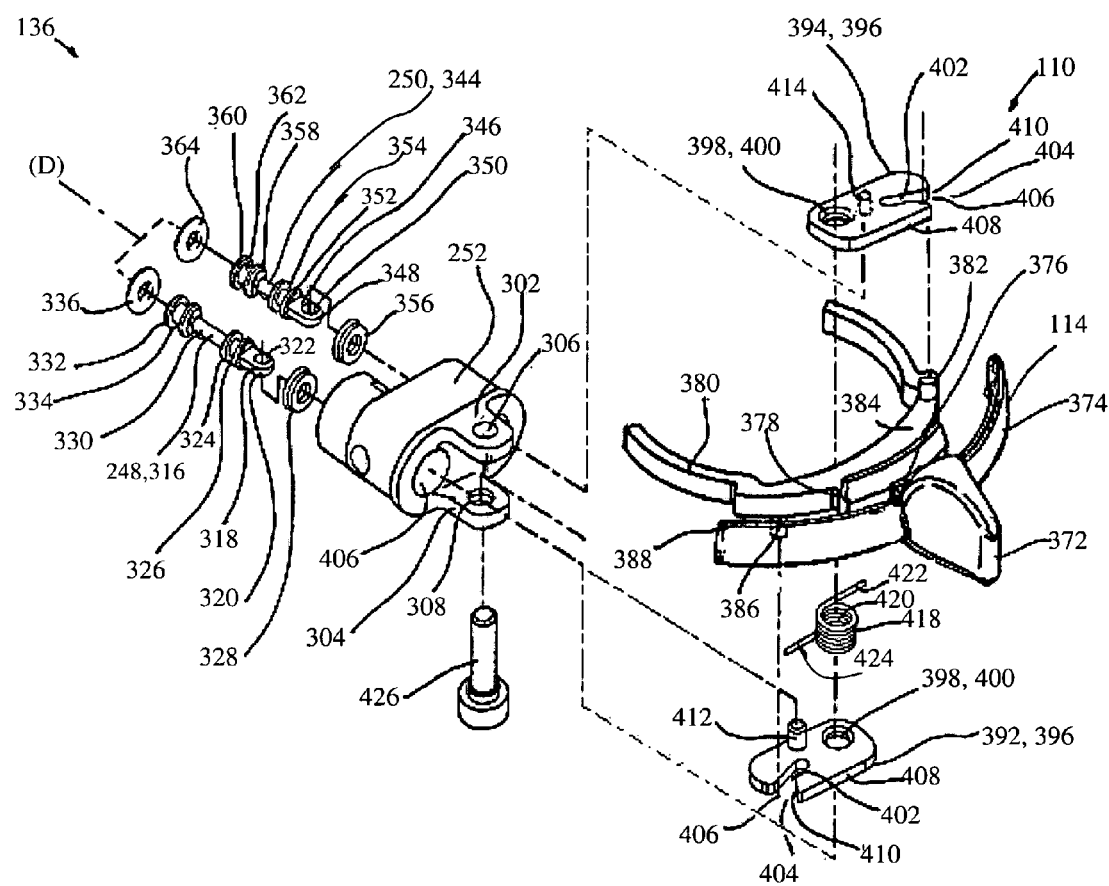

As shown in FIGS. 9D and 11A, the jet valve 248 is located primarily within the jet valve lumen 282. The jet valve 248 includes a jet valve shaft 316 oriented axially within the jet valve lumen. A jet valve tab 318 is formed on a right end portion 320 of the jet valve 248 and defines an aperture 322 that in practice is vertically oriented. The jet valve tab extends 318 beyond the jet valve lumen 282 and the right cap portion 278 of the valve body 252. Two right radial flanges 324 are formed on the jet valve shaft 316 to define a first channel 326 therebetween. The right radial flanges 324 are located toward the right end portion 320 of the jet valve shaft 316 and are positioned within the jet valve lumen 282. A cup seal 328 is positioned within the first channel 326 and is restrained from axial movement along the jet valve shaft by the right radial flanges 324. The right radial flanges have an overall diameter that is slightly less than the inside diameter of the jet valve lumen, and the cup seal has a diameter that is slightly larger than the jet valve lumen. As such, when subjected to water pressure, the cup seal provides a water-tight seal between the jet valve and the valve body. Further, when not subjected to water pressure, the cup seal allows the jet valve to move easily back and forth axially within the jet valve lumen.

As shown in FIGS. 9D and 11A, a left end portion 330 of jet valve 248 extends from the jet valve lumen 282 and into the first manifold chamber 256. Two left radial flanges 332 are formed on the jet valve shaft 316 to define a second channel 334 therebetween. The left radial flanges 332 are located toward the left end portion 330 of the jet valve shaft 316 and are positioned within the first manifold chamber 256. An O-ring 336 of having a diameter that is slightly larger than the diameter of the jet valve lumen 282 is positioned within the second channel 334 and is restrained from axial movement along the jet valve shaft 316 by the left radial flanges 332. As previously mentioned, the angled mating surface 294 on the left end portion 310 of the jet valve lumen 282 is adapted to interface with the O-ring 336 on the jet valve 248, which creates a water-tight seal when the O-ring is positioned against the jet valve lumen. As shown in FIG. 11A, a jet duct 338 is located opposite the jet valve lumen 282 in the first manifold chamber 256. As discussed in more detail below, the jet duct provides fluid communication between the first manifold chamber 256 and the second outlet 124. As shown in FIG. 11A, the inner diameter of the jet duct 338 is slightly smaller than the outer diameter of the O-ring 336, and a right end portion 340 of the jet duct 338 leading from the first manifold chamber 256 is chamfered to define an angled mating surface 342 adapted to interface with the O-ring 336. As such, a water-tight seal is created when the O-ring on the jet valve is positioned against the angled mating surface on the jet duct.

As shown in FIGS. 9D and 11A, the filter valve 250 is located primarily within the filter valve lumen 284. The filter valve 250 includes a filter valve shaft 344 oriented axially within the filter valve lumen. A filter valve tab 346 is formed on a right end portion 348 of the filter valve 250 and defines an aperture 350 that in practice is vertically oriented. The filter valve tab 346 extends beyond the filter valve lumen 284 and the right cap portion 278 of the valve body 252. Two right radial flanges 352 formed on the filter valve shaft 344 to define a first channel 354 therebetween. The right radial flanges 352 are located toward the right end portion 348 of the filter valve shaft 344 and are positioned within the filter valve lumen 284. A cup seal 356 is positioned within the first channel 354 and is restrained from axial movement along the filter valve shaft by the right radial flanges 352. The right radial flanges have an overall diameter that is slightly less than the inside diameter of the filter valve lumen. The cup seal has a diameter that is slightly larger than the filter valve lumen. As such, when subjected to water pressure, the cup seal provides a water-tight seal between the filter valve and the valve body. Further, when not subjected to water pressure, the cup seal allows the filter valve to move easily back and forth axially within the jet valve lumen.

As shown in FIGS. 9D and 11A, a left end portion 358 of the filter valve 250 extends from the filter valve lumen 284 and into the second manifold chamber 258. Two left radial flanges are formed on the filter valve shaft 344 to define a second channel 362 therebetween. The left radial flanges 360 are located on the left end portion 358 of the filter valve shaft 344 and are positioned within second manifold chamber 258. An O-ring 364 of having a diameter that is slightly larger than the diameter of the filter valve lumen 284 is positioned within the second channel 362 and is restrained from axial movement along the filter valve shaft by the left radial flanges 360. As previously mentioned, the angled mating surface 296 on the left end portion 312 of the filter valve lumen 284 is adapted to interface with the O-ring 364 on the filter valve 250, which creates a water-tight seal when the O-ring is positioned against the filter valve lumen. As shown in FIG. 11A, a filter duct 366 is located opposite the filter valve lumen 284 in the second manifold chamber 258. As discussed in more detail below, the filter duct 366 provides fluid communication between the second manifold chamber 258 and the filter cartridge assembly 134. As shown in FIG. 11A, the inner diameter of the filter duct 368 is slightly smaller than the outer diameter of the O-ring 364, and a right end portion 368 of the filter duct 366 leading from the second manifold chamber 258 is chamfered to define an angled mating surface 370 adapted to interface with the O-ring 364. As such, a water-tight seal is created when the O-ring on the filter valve is positioned against the angled mating surface on the filter duct.

As previously mentioned, a user can use the actuator mechanism 110 to manipulate the positions of the filter valve 250 and the jet valve 248. In particular, the actuator mechanism 110 is adapted to engage the jet valve tab 318 and the filter valve tab 346 to move the jet valve and the filter valve within the filter body 252 and manifold 156 to actuate one of the three modes of operation of the end-of-faucet filter 100. More particularly, the actuator mechanism 110 is used to position the O-ring 336 on the jet valve 248 in the first manifold chamber 256 either against the jet valve lumen 282 or the jet duct 338 as well as position the O-ring 364 on the filter valve 250 in the second manifold chamber 258 either against the filter valve lumen 284 or the filter valve duct 366. As discussed in more detail below, the positions of the O-rings within the first and second manifold chambers cause water flowing through the inlet port 254 to be dispensed from either the first 118, second 124, or third outlets 130 of the end-of-faucet filter 100.

As shown in FIGS. 9D and 11A, the actuator mechanism 110 includes several components, some of which are located inside of the header assembly housing 140, and some of which are located outside the housing of the header assembly. The actuator mechanism 110 includes the integral actuator switch 114 having a finger grip 372, an actuator shroud 347, an actuator bridge 376, a bearing plate 378, and a snap collar 380. Additionally, a filter cam pin 382 extends vertically from a top, back side 384 of the snap collar, and a jet cam pin 386 extends vertically from a bottom, front side 388 of the snap collar. Referring to FIGS. 9A, 9C, and 11C, when the upper housing 148 and lower housing 150 are brought together about the manifold 156 during assembly of the end-of-faucet filter 100, a slot 390 is formed between the upper housing and lower housing on the right side of the header assembly 136. The actuator bridge 376 is positioned inside the slot 390 so that the finger grip 372 and actuator shroud 347 are positioned outside the housing 140, while the bearing plate 378 and snap collar 380 are positioned inside the housing. The actuator shroud 347 hides the slot from external view, as shown in FIG. 11.

As shown in FIG. 11B, the front 274 and rear snap collar channels 276 on the manifold 156 are adapted to receive the snap collar 380. As such, as a user moves the finger grip 372 backward or forward, the snap collar slides rotationally within the front and rear snap channels. At the same time, the actuator bridge 376 moves forward and backward within the slot 390. Additionally, the bearing plate 378 interfaces with and moves along the interior surfaces of the upper housing 148 and lower housing 150 above and below the slot, respectively, when the finger grip is moved. Therefore, the bearing plate provides some vertical stability to the actuator mechanism 110 when operated.

As shown in FIG. 9D, the actuator mechanism 110 includes two identical cams, referred to herein as a jet cam 392 and a filter cam 394, adapted to engage the actuator switch 114 and the valves (348,250) such that movement of the actuator switch causes the filter and/or jet valves to move. The jet cam 392 and filter cam 394 are elongated, generally rectangular plates 396 with rounded corners. A cam aperture 398 is formed in a first corner 400 of the each plate 396 and a pin slot 402 is formed in a second corner 404 diagonally opposed to the first corner 400. The pin slot 402 angles from the second corner 404 diagonally inward toward the first corner 400 to a point generally in the center of the plate 396. An open end 406 of the pin slot 402 widens at an angle toward a longitudinal edge 408 of the plate opposite the cam aperture in the first corner, thereby creating a leading edge 410 for the pin slot 402. The jet cam 392 and the filter cam 394 each have a peg, referred to herein as a jet cam peg 412 and a filter cam peg 414, respectively. Each peg extends vertically from the plate, and each peg is generally centered with respect to the length of the plate and offset toward a lengthwise edge 416 of the plate 396 adjacent to the cam aperture 398 in the first corner 400.

Figure 11D:
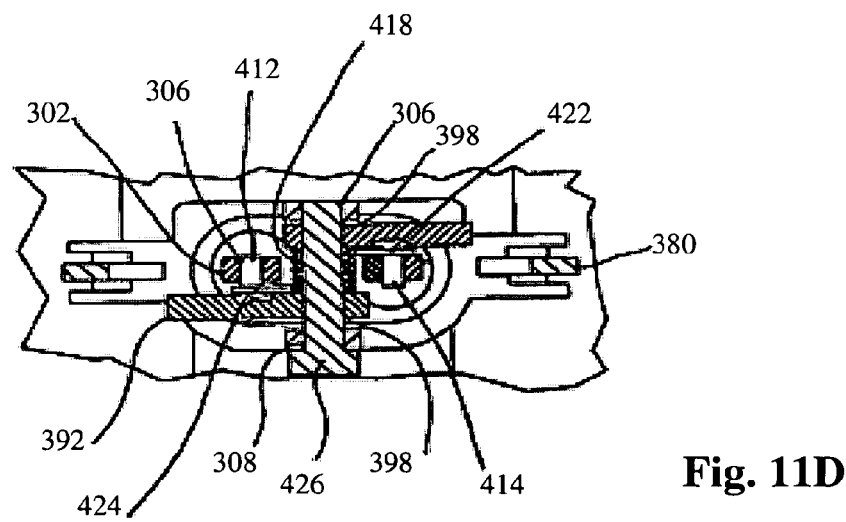
FIG. 11D is a cross-sectional view of the end-of-faucet filter depicted in FIG. 11A, taken along line 11D-11D.
Figure 11E:
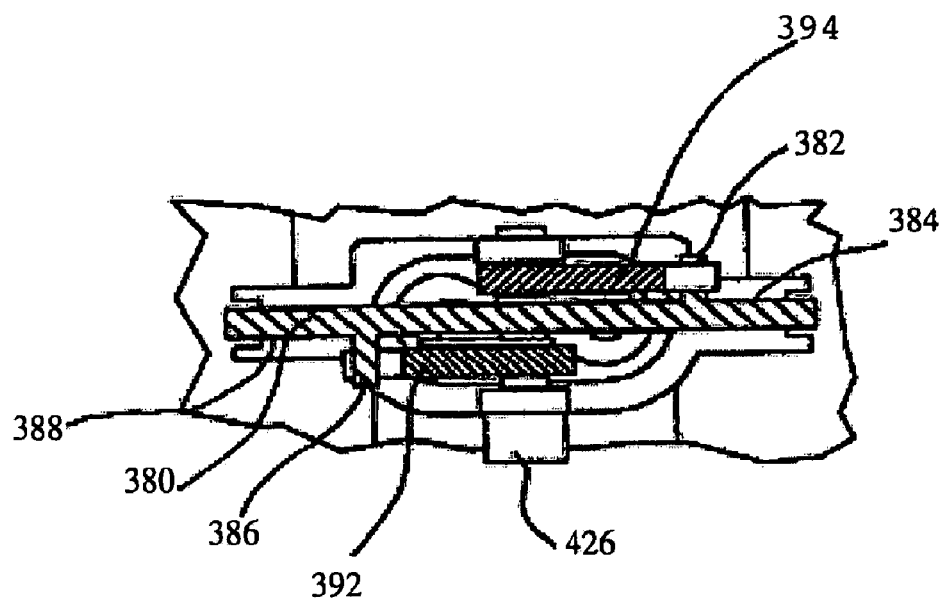
FIG. 11E is a cross-sectional view of the end-of-faucet filter depicted in FIG. 11A, taken along line 11E-11E.
Figure 12A:
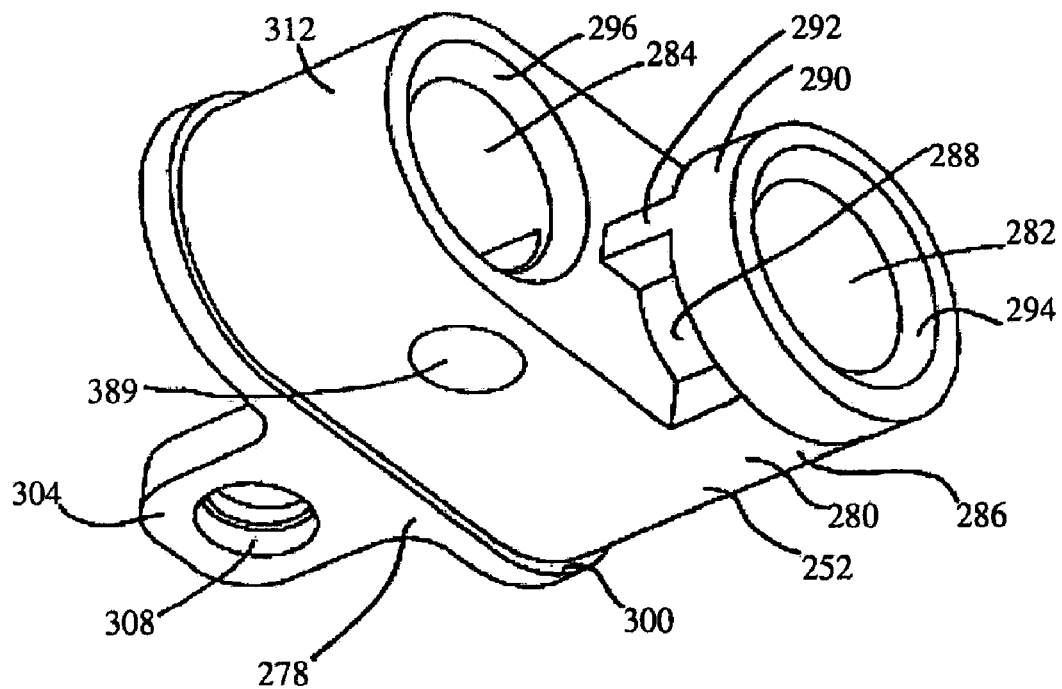
FIG. 12A is a rear bottom isometric view of the valve body.
Figure 12B:
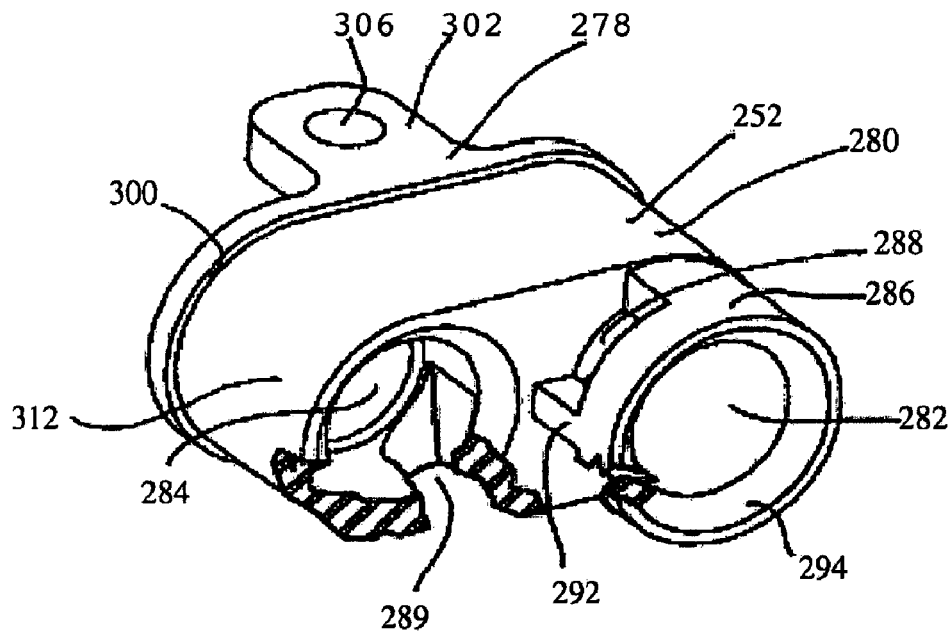
FIG. 12B is a rear top isometric view of the valve body partially cut away.
Figure 12C:
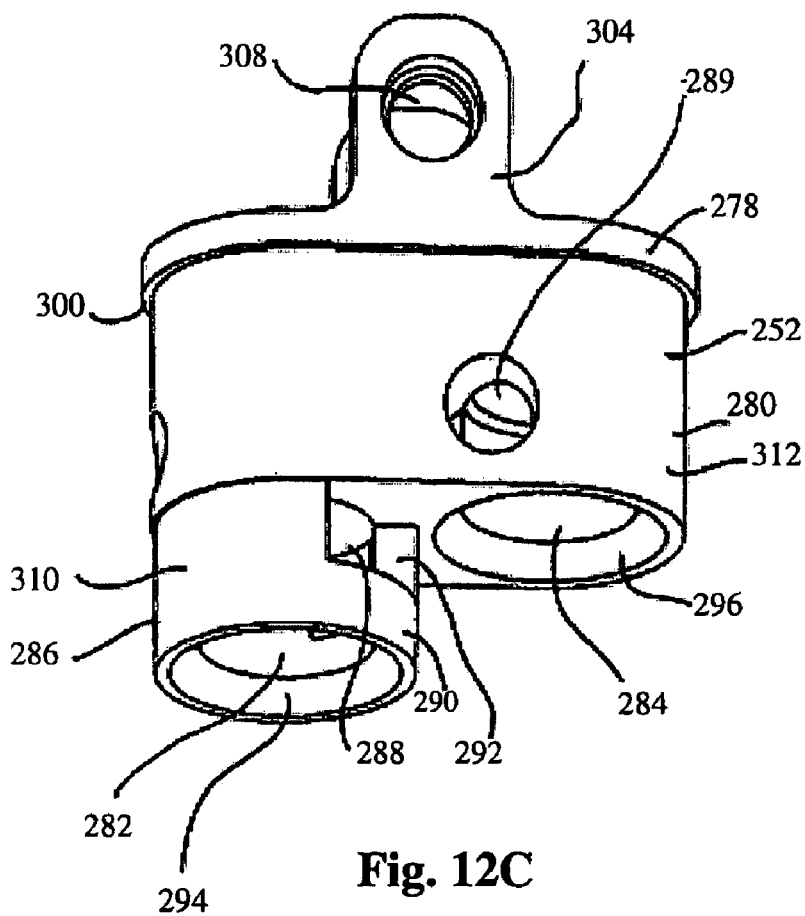
FIG. 12C is a left bottom isometric view of the valve body.
Figure 12D:
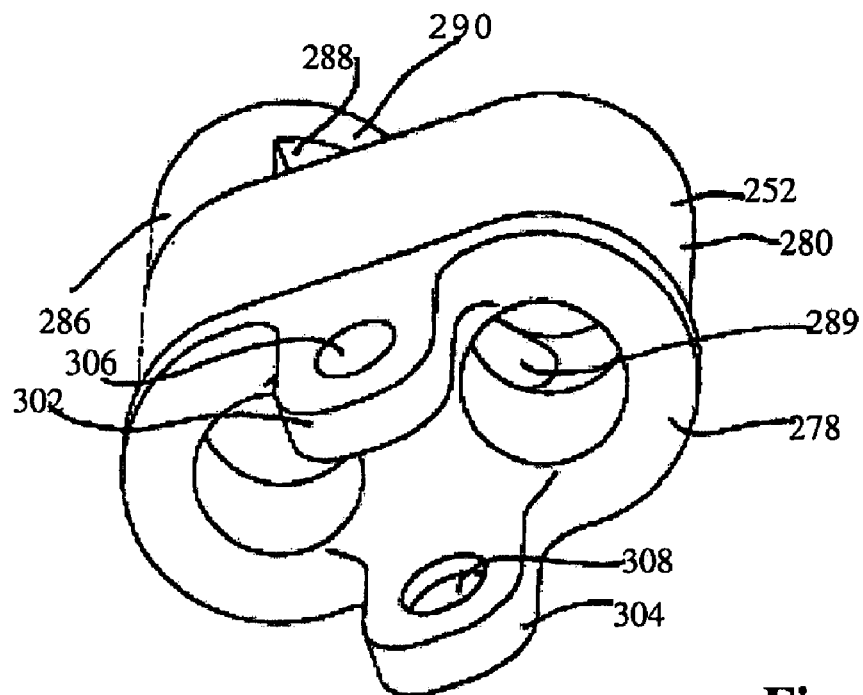
FIG. 12D is a right side isometric view of the valve body.
Figure 12E:
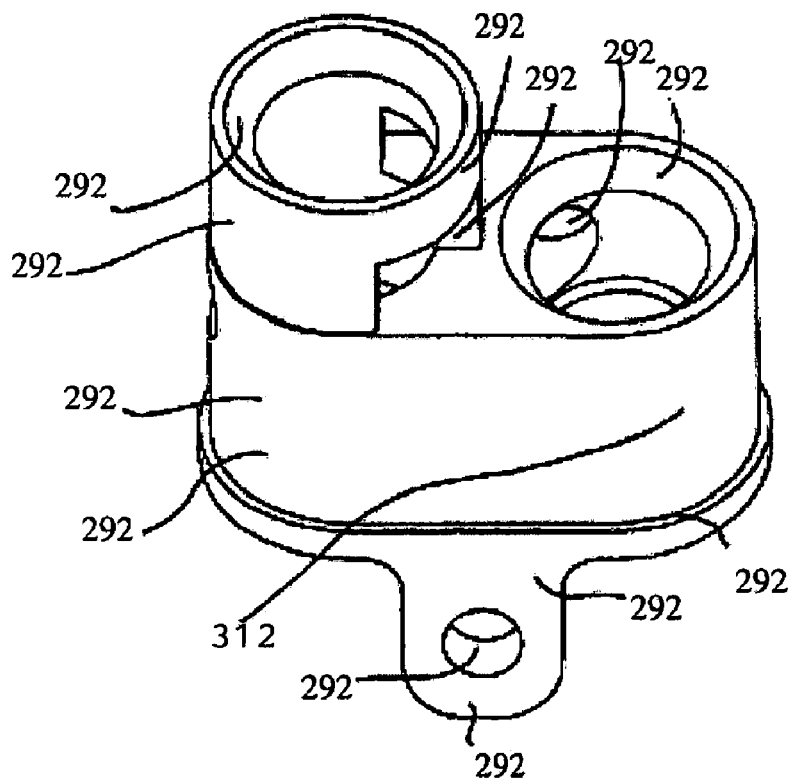
FIG. 12E is a bottom side isometric view of the valve body.

As shown in FIGS. 11A, 11D, and 11E, the jet cam 392 is oriented with the jet cam peg 412 extending upward with the cam aperture 398 located above and axially aligned with the aperture 308 in the lower valve tab 304 of the valve body 252. As such, the pin slot 410 of the jet cam 392 is oriented toward the front of the end-of-faucet filter 100. The filter cam 394 is oriented with the filter cam peg 414 extending downward with the cam aperture 398 located below and axially aligned with the aperture 306 in the upper valve tab 302 of the valve body 252. As such, the pin slot 402 of the filter cam 394 is oriented toward the rear of the end-of-faucet filter 100. As shown in FIGS. 9D and 11D, an actuator spring 418 is positioned between the jet cam 392 and the filter cam 394 with a center 420 of the actuator spring 418 axially aligned with the cam apertures 398 of the jet cam and the filter cam. An upper wire end 422 of the actuator spring 418 contacts and is biased against the filter cam peg 414, and a lower wire end 424 of the actuator spring contacts and is biased against the jet cam peg 412. An actuator pin 426 is inserted axially through the aperture 308 in the lower valve tab 304, the cam aperture 398 of this jet cam 392, the center 420 of the actuator spring 418, the aperture 398 of the filter cam 394, and the aperture 306 in the upper valve tab 302, axially aligning and retaining each of these components together.

As shown in FIG. 11D, the jet cam peg 412 is inserted into the aperture 306 in the jet valve tab 302 to create a linkage between the actuator mechanism 110 and the jet valve 248, and the filter cam peg 414 is similarly inserted into the aperture 306 in the filter valve tab 302 to create a linkage between the actuator mechanism and the filter valve 250. The jet cam pin 386 on the bottom, front side 388 of the snap collar 380 is positioned to engage the leading edge 410 of the pin slot 402 in the jet cam 392. Similarly, the filter cam pin 382 on the top, rear side 384 of the snap collar 380 is positioned to engage the leading edge 410 of the pin slot 402 in the filter cam 394.

Figure 13:
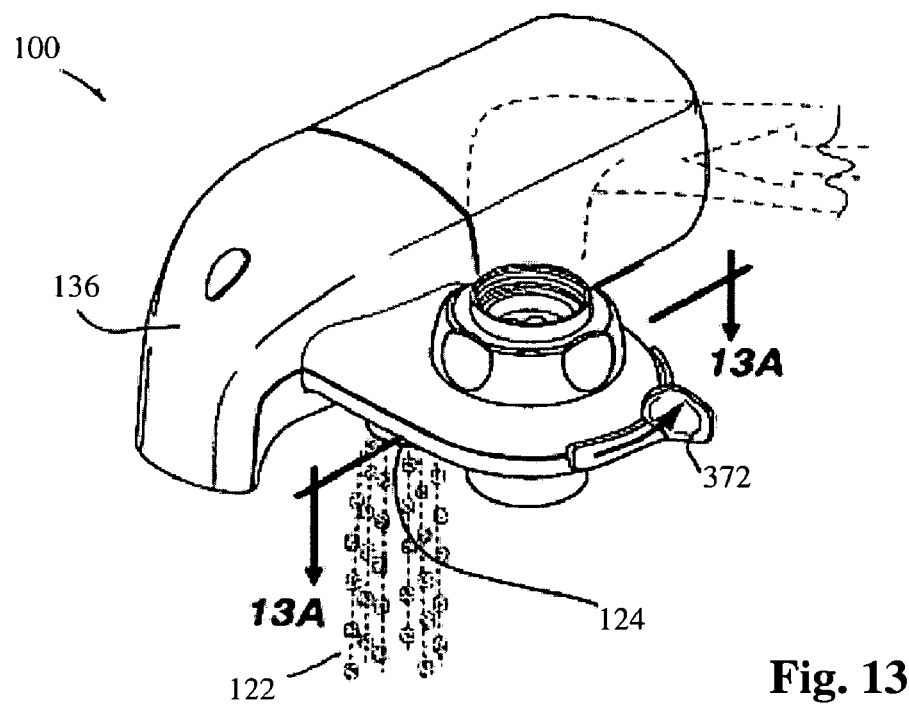
FIG. 13 is a top isometric view of the end-of-faucet filter in a second mode of operation.
Figure 13A:
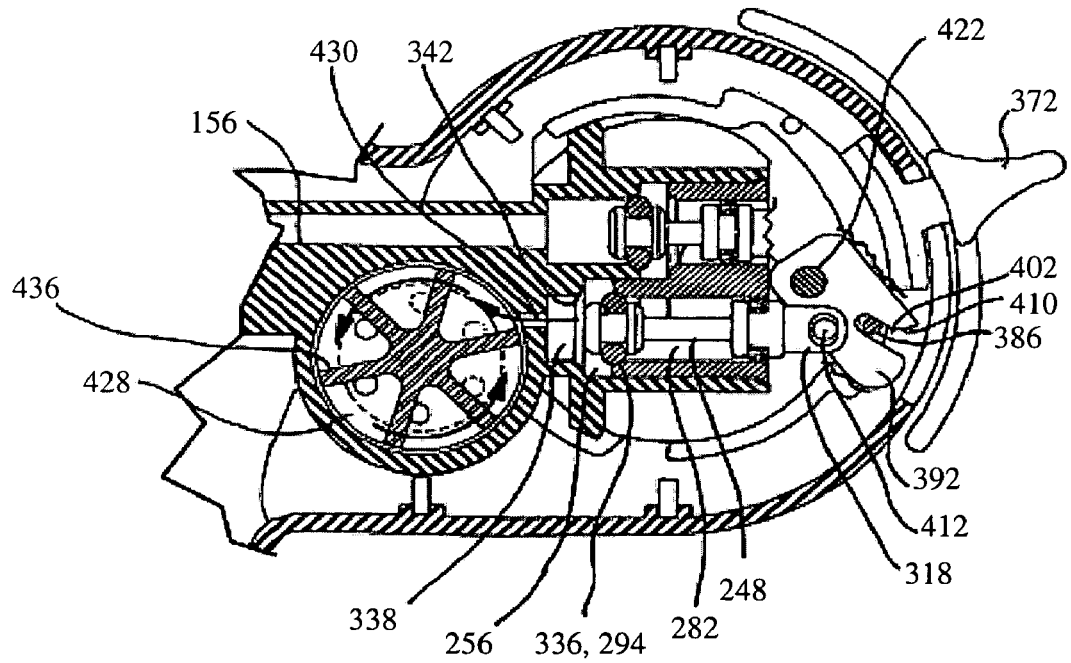
FIG. 13A is a cross-sectional view of the end-of-faucet filter depicted in FIG. 13, taken along line 13A-13A.

As shown in FIG. 11A, the O-ring 336 on the jet valve 248 located within the first manifold chamber 256 is positioned against the angled mating surface 342 of the jet duct 338. Referring now to FIGS. 13-13A, when a user moves the finger grip 372 in a rearward direction, the jet cam pin 386 engages the leading edge 410 of the pin slot 402 on the jet cam 392 and moves within the pin slot, which causes the jet cam 392 to rotate about the actuator pin 422. As the jet cam rotates, the jet cam peg 412 engages the jet valve tab 318 and pulls the jet valve 248 within the jet valve lumen 282. More particularly, the O-ring 336 on the jet valve 248 located within the first manifold chamber 256 will move from the angled mating surface 342 of the jet duct 338 and toward the angled mating surface 294 of the jet valve lumen 282, as shown in FIG. 13A. As such, if the user moves the finger grip a sufficient distance in the rearward direction, the O-ring on the jet valve located within the first manifold chamber will press against the angled mating surface of the jet valve lumen.

Figure 14:
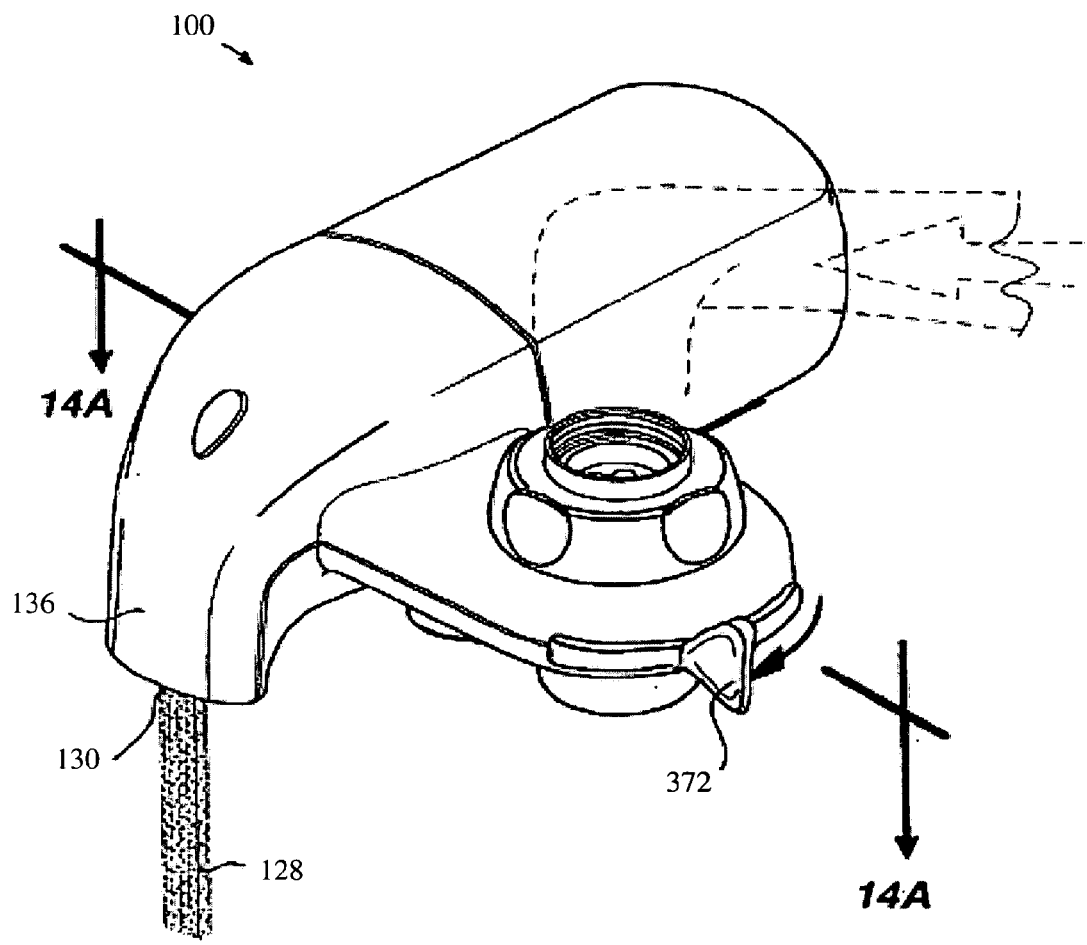
FIG. 14 is a top isometric view of the end-of-faucet filter in a second mode of operation.
Figure 14A:
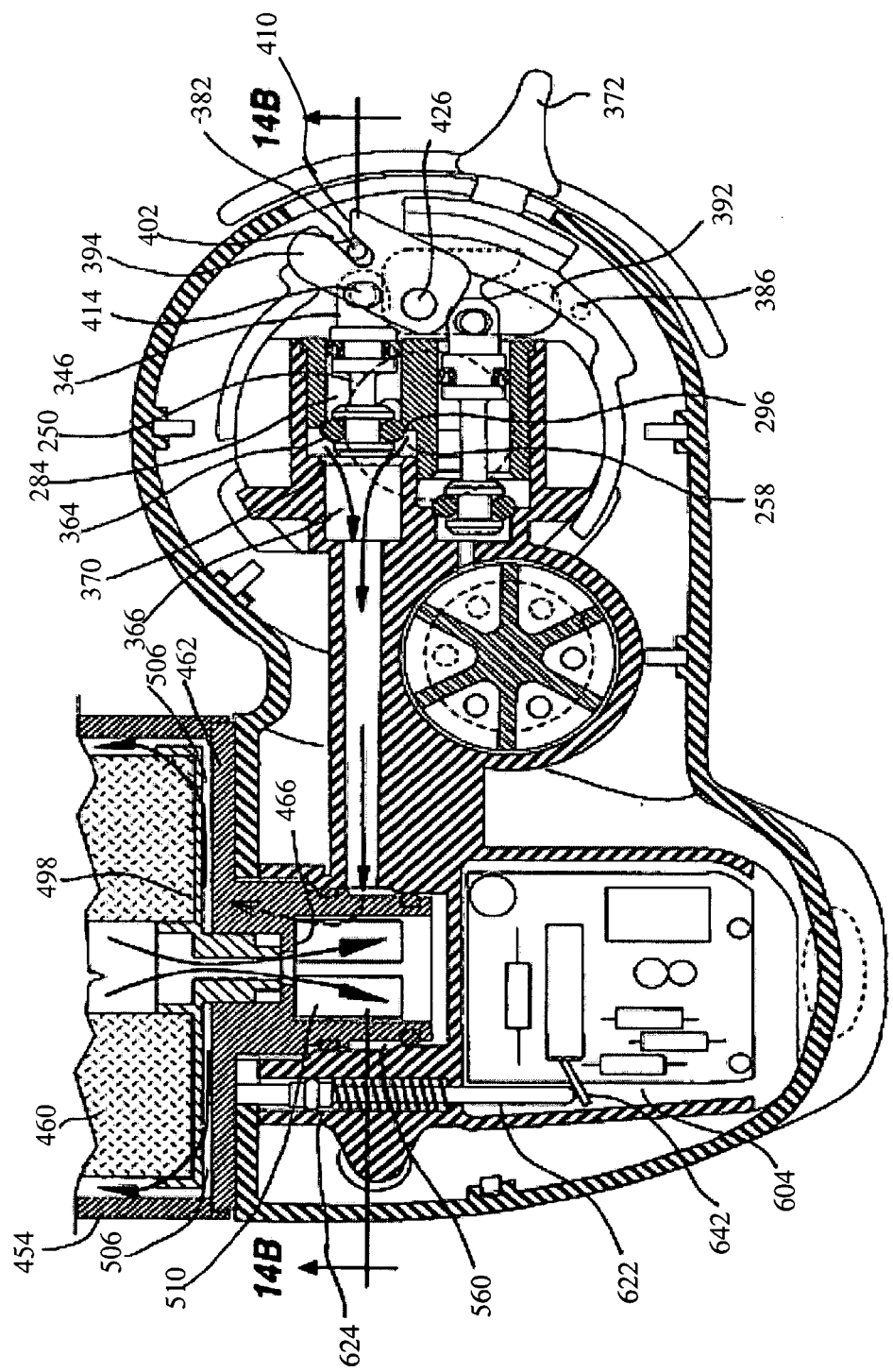
FIG. 14A is a cross-sectional view of the end-of-faucet filter depicted in FIG. 14, taken along line 14A-14A.
Figure 14B:
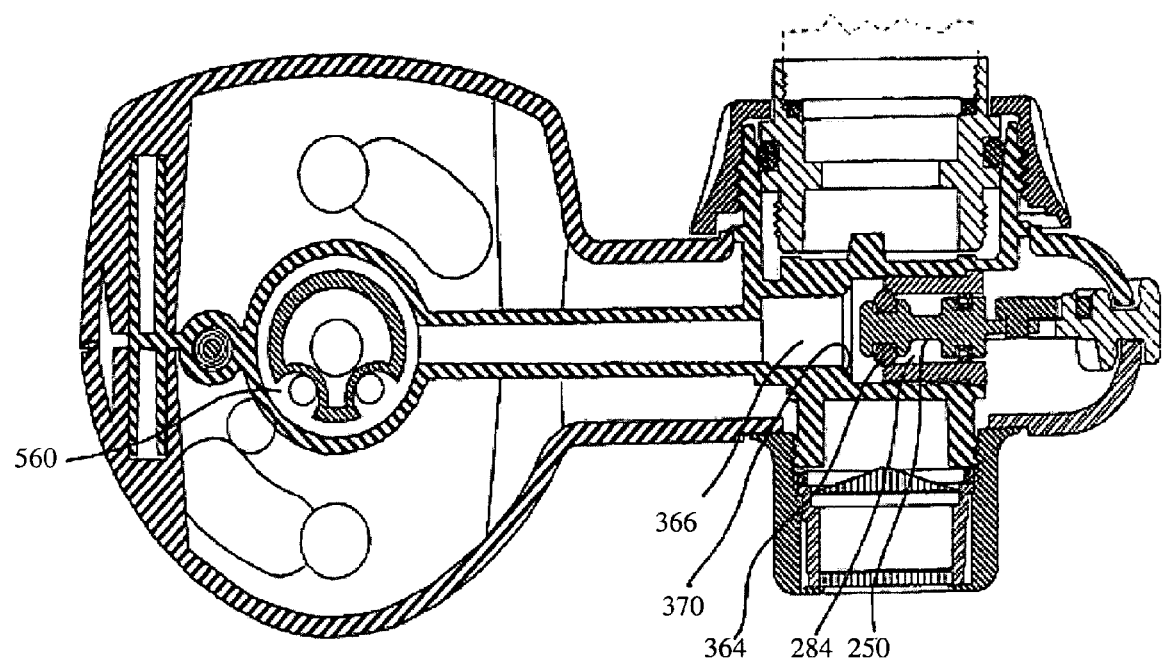
FIG. 14B is a cross-sectional view of the end-of-faucet filter depicted in FIG. 14A, taken along line 14B-14B.

As shown in FIG. 11A, the O-ring 364 on the filter valve 250 located within the second manifold chamber 258 is positioned against the angled mating surface 370 of the filter duct 366. Referring now to FIGS. 14-14B, when a user moves the finger grip 372 in a forward direction, the filter cam pin 382 engages the leading edge 410 of the pin slot 402 on the filter cam 394 and moves within the pin slot, which causes the filter cam 394 to rotate about the actuator pin 426. As the filter cam rotates, the filter cam peg 414 engages the filter valve tab 346 and pulls the filter valve 250 within the filter valve lumen 284. More particularly, the O-ring 364 on the filter valve 250 located within the second manifold chamber 258 will move from the angled mating surface 370 of the filter duct 366 and toward the angled mating surface 296 of the filter valve lumen 284, as shown in FIGS. 14A-14B. As such, if the user moves the finger grip a sufficient distance in the forward direction, the O-ring on the filter valve located within the second manifold chamber will press against the angled mating surface of the filter valve lumen. Because the actuator mechanism 110 acts to pull the jet valve 248 and filter valve 250 partially from the valve body 252, the snap collar 380 can include a recessed area opposite the bearing plate 378 to allow sufficient clearance for the jet valve tab 318 and the filter valve tab 346 as each is pulled outward from the valve body.

As discussed above, a user can use the actuator mechanism 110 to manipulate the positions of the filter valve 250 and the jet valve 248. More particularly, the actuator mechanism is used to position the O-ring 336 on the jet valve in the first manifold chamber 256 either against the jet valve lumen 282 or the jet duct 338 as well as position the O-ring 364 on the filter valve in the second manifold chamber 258 either against the filter valve lumen 284 or the filter duct 366. As discussed in more detail below, the positions of the O-rings within the first and second manifold chambers cause water flowing through the inlet port to be dispensed from either the first, second, or third outlets of the end-of-faucet filter.

Referring to FIG. 13, the second outlet 124 is located on the bottom side of the header assembly 136 and provides a discharge of pulsed jet spray of water 122 from the end-of-faucet filter 100. As previously mentioned, the jet duct 338 provides fluid communication between the first manifold chamber 256 and the second outlet 124. More particularly, the jet duct 338 extends within the manifold 156 between the first manifold chamber 256 and a pulse turbine chamber 428, which may be formed integrally with the manifold 156. As shown in FIGS. 9B, 10C, and 13A, the jet duct 338 empties into the pulse turbine chamber 428 via a pulse turbine port 430, and water is discharged from the second outlet 124 through a pulse turbine cover 432 that forms a bottom enclosure 434 to the pulse turbine chamber 338, also shown in FIGS. 9b-9C. It is to be appreciated that the pulse turbine cover 432 can be connected with tine pulse turbine chamber 428 in various ways. For example, in some embodiments of the present invention, the pulse turbine cover is screwed into the pulse turbine chamber. In other embodiments, the pulse turbine cover is seated against a lip in the pulse turbine chamber and ultrasonically welded to the manifold to create a water-tight seal.

Figure 16:
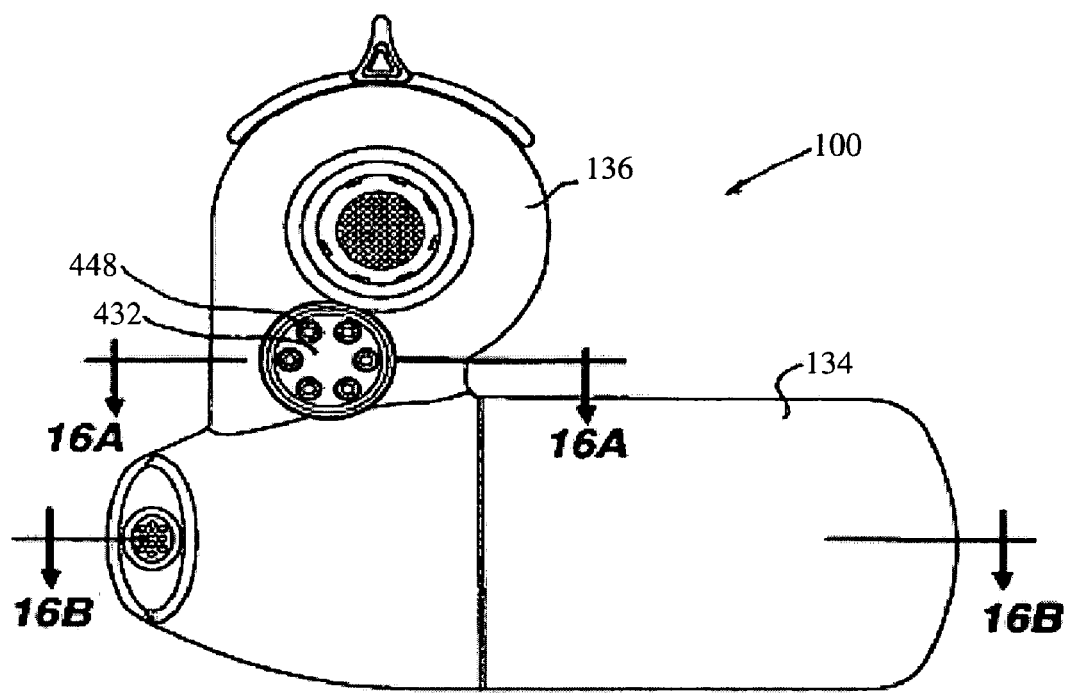
FIG. 16 is a bottom view of the end-of-faucet filter shown in FIG. 1.
Figure 16A:
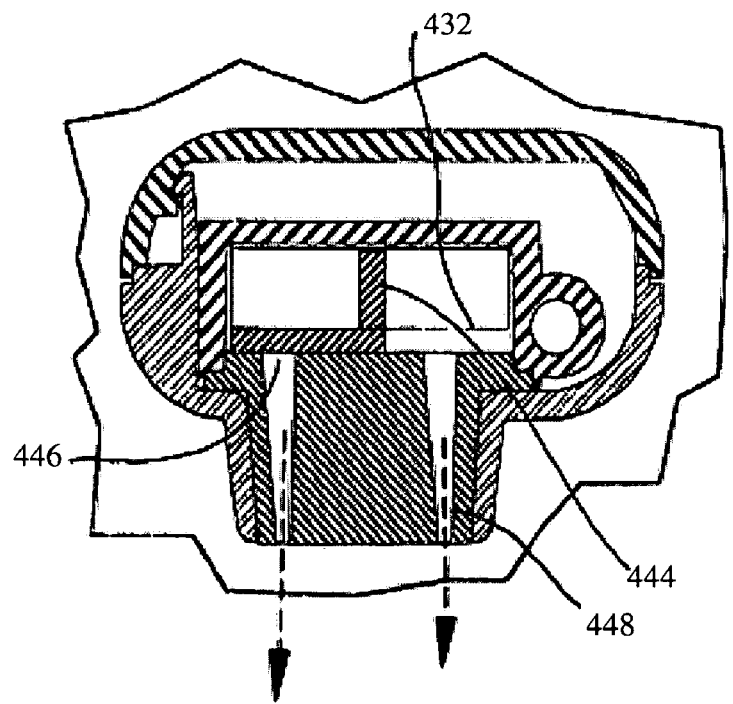
FIG. 16A is a cross-sectional view of end-of-faucet filter depicted in FIG. 16, taken along line 16A-16A.

As shown in FIGS. 9B, 13A, and 16A, a pulse turbine 436 with a plurality of blades 438 is located within the pulse turbine chamber 428. Although the pulse turbine 436 depicted herein includes six blades, it is to be appreciated that other embodiments of the present invention include a greater or fewer number of blades. The blades 438 extend radially from a center hub 440 that defines an aperture 442. The aperture 442 in the center hub 440 is adapted to receive a spindle 444 extending upwardly from the pulse turbine cover 432. As such, the turbine can rotate about the spindle. In other embodiments of the present invention, the pulse turbine is not rotatably coupled with a spindle, and as such, can freely rotate within the confines of the pulse turbine chamber. As shown in FIG. 13A, the pulse turbine port is oriented to introduce water into the pulse turbine chamber in a flow direction that is generally normal to faces of the blades. As such, water emerging from the pulse turbine port impacts the blades, causing the pulse turbine to rotate around the spindle.

As shown in FIGS. 9B-9C and 13A, water exits the pulse turbine chamber 428 through six jet outlet apertures 446 located in the pulse turbine cover 432. The outlet apertures 446 are equally spaced apart and are located at a common radius from the spindle 444. From the outlet apertures, water travels into six jet nozzles 448 formed on the pulse turbine cover 432 that are in alignment with the jet outlet apertures 446. It is to be appreciated that a greater or fewer number of jet outlet apertures and jet nozzles can be used. The jet nozzles create straight and narrow streams of water exiting the pulse turbine chamber, rather than a spray or splattering output. As shown in FIG. 9B, the pulse turbine 436 can also include a web 450 extending between the bottom edges of two or more of the blades 438. The web 450 blocks the flow of water through any of the jet outlet apertures 446 it happens to cover at any given time, thereby creating a pulsating flow. In the embodiment depicted, the web extends between three blades to cover two adjacent sectors of the pulse turbine. The web allows the turbine to create a pulsating effect in the outflow of water through the jet nozzles as at any one time as the pulse turbine rotates within the pulse turbine chamber, two of the jet outlet apertures, and therefore two of the jet nozzles, are effectively closed. It is to be appreciated that if there were only one jet outlet aperture and corresponding jet nozzle, there would not be a constant flow of water from the pulse turbine chamber, but instead a single, intermittent, pulsating flow. It should also be appreciated that other embodiments of the present need not include a pulse turbine and, as such, provide a constant jet nozzle flow instead of a pulsating flow output.

Referring back to FIG. 4, the third outlet 130 is located on the bottom left side of the header assembly 136 and provides a discharge of filtered water 128 from the end-of-faucet filter 100. As previously mentioned, the filter duct 366 is fluidly coupled with the second manifold chamber 258. As discussed in more detail below, water flows from the second manifold chamber 258, through the filter duct 366 in the header assembly 136 and into the filter cartridge assembly 134, where the water is filtered. Filtered water then exits from the filter cartridge assembly 134 and re-enters the header assembly 136 and is discharged from the third outlet 130.

Figure 6:
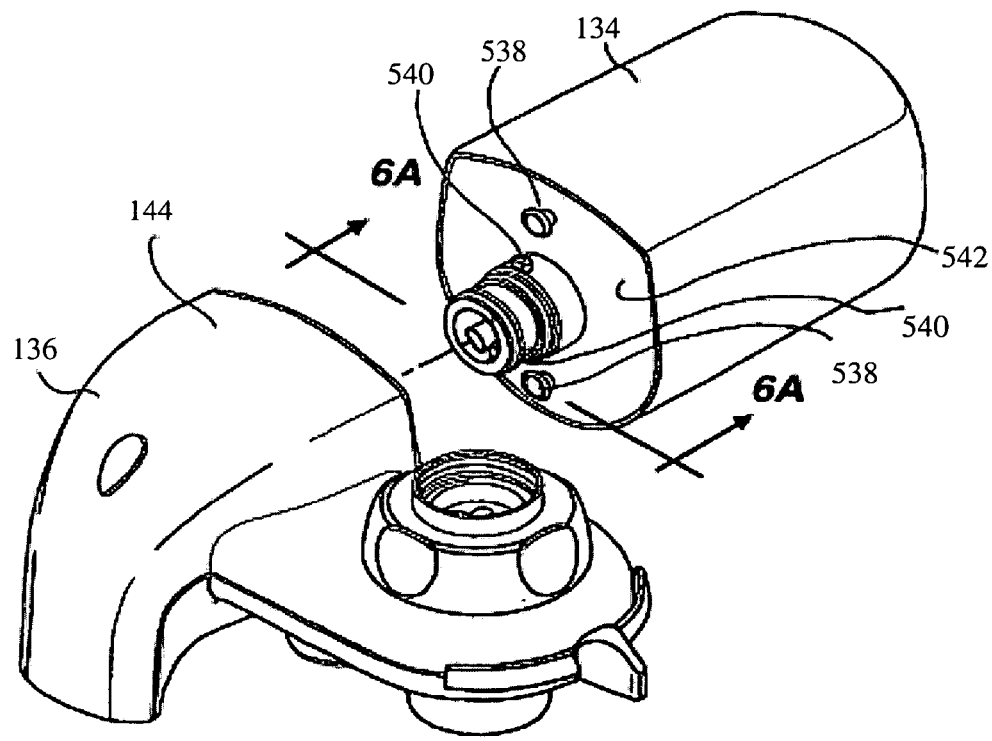
FIG. 6 is an isometric view of the end-of-faucet filter FIG. 5 showing a filter cartridge separated from a header assembly.
Figure 6A:
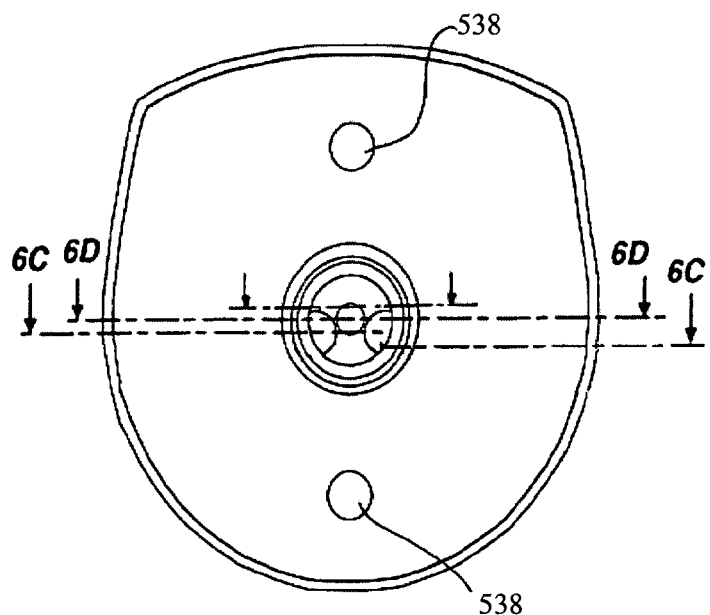
FIG. 6A is a view of filter cartridge depicted in FIG. 6, illustrated along line 6A-6A.
Figure 6B:
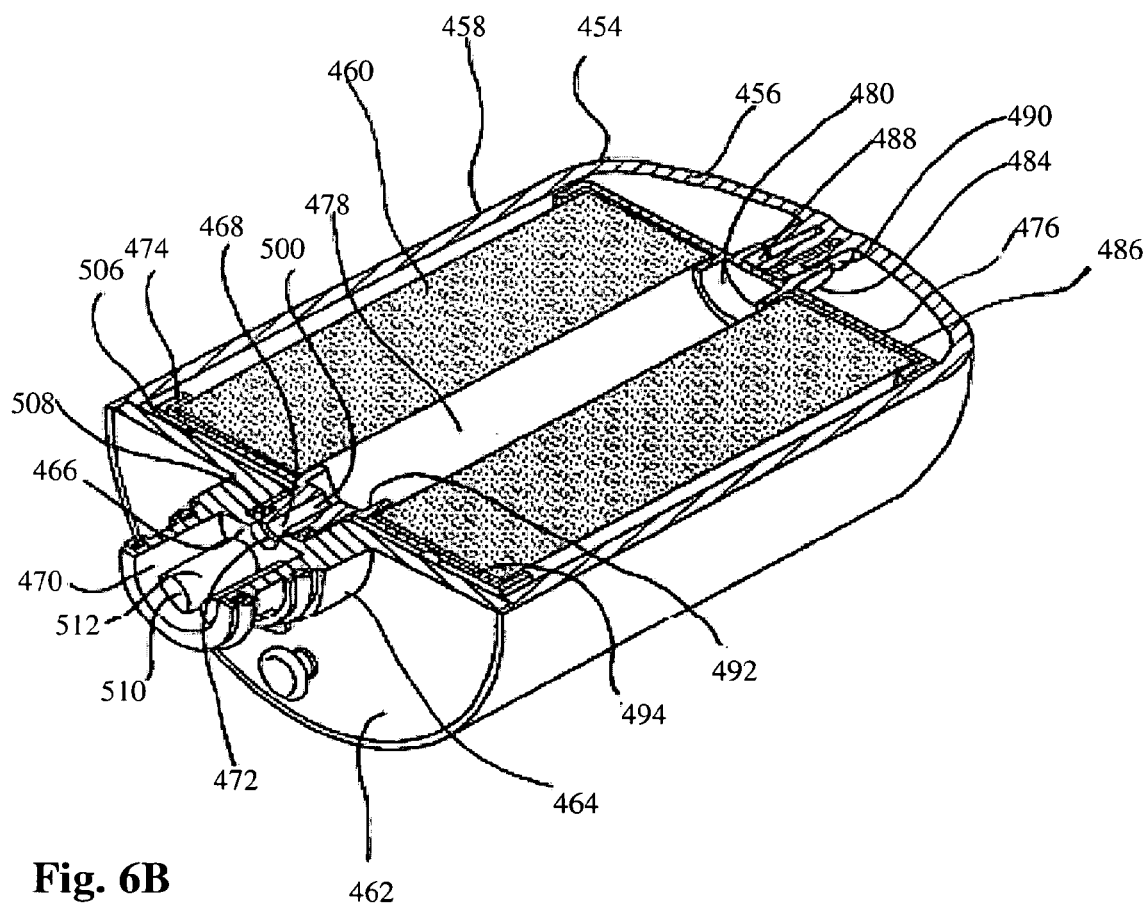
FIG. 6B is a cross-sectional view of filter cartridge assembly depicted in FIG. 6A, taken along line 6B-6B.
Figure 6C:
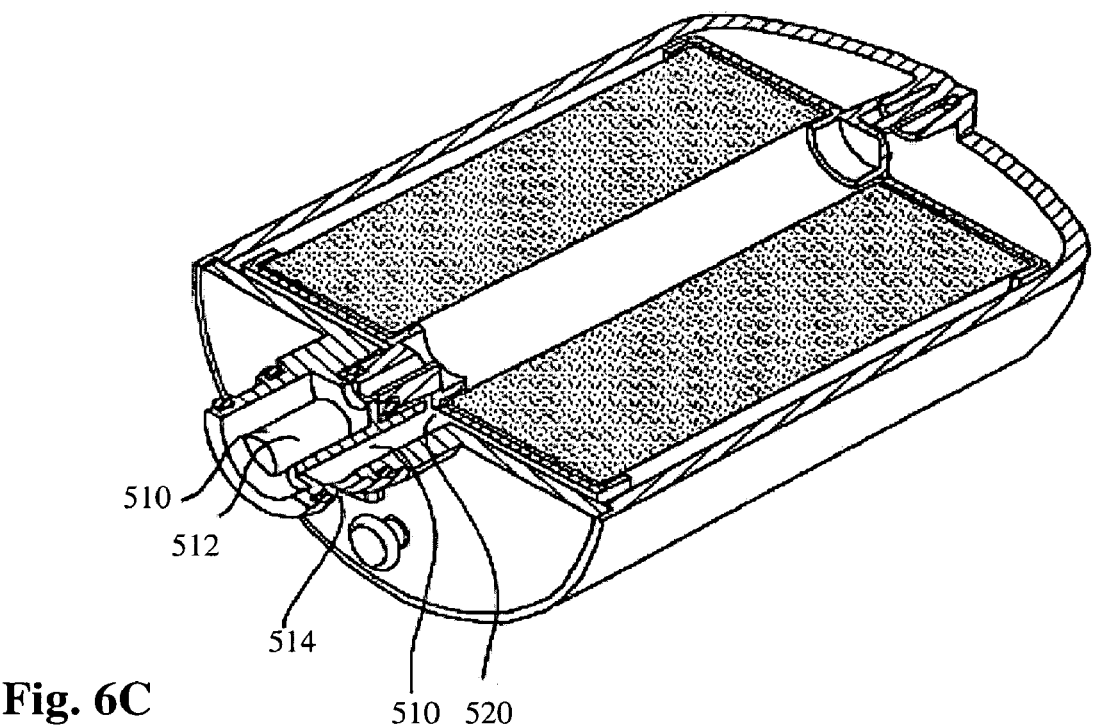
FIG. 6C is a cross-sectional view of filter cartridge assembly depicted in FIG. 6A, taken along line 6C-6C.
Figure 6D:
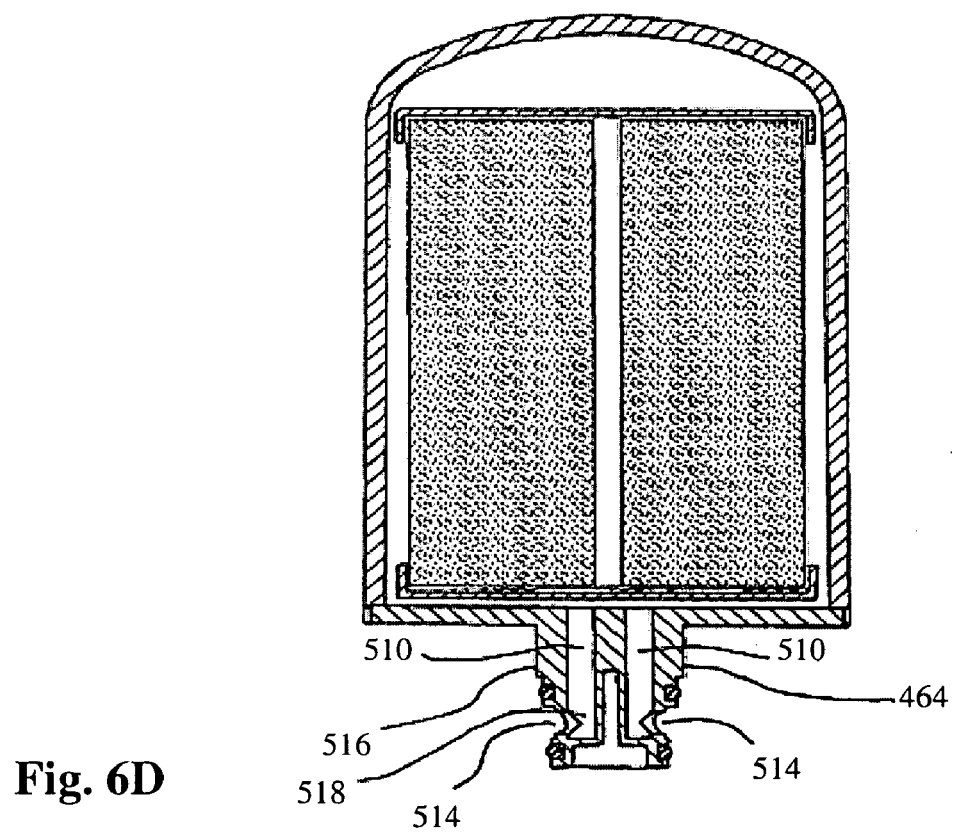
FIG. 6D is a cross-sectional view of filter cartridge assembly depicted in FIG. 6A, taken along line 6D-6D.
Figure 7:
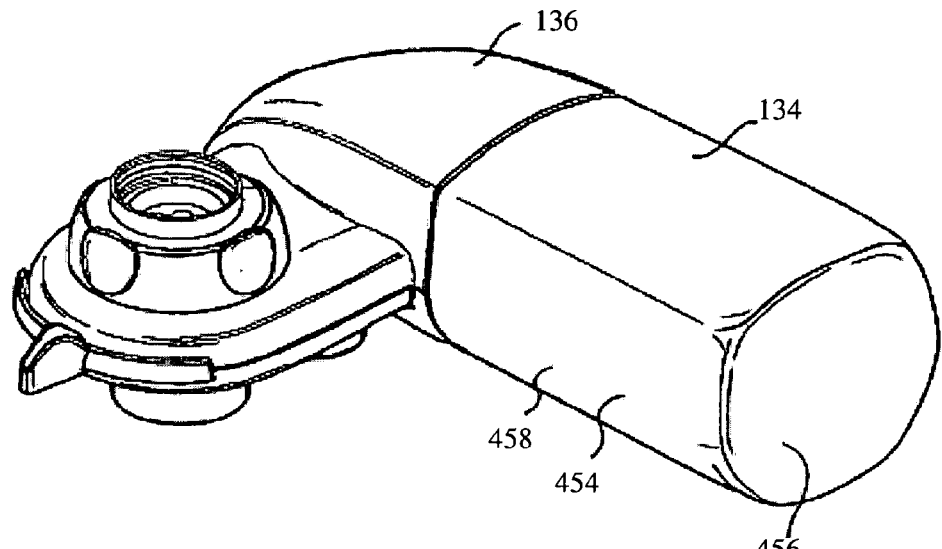
FIG. 7 is a right isometric view of the end-of-faucet filter shown in FIG. 1 from a top rear perspective.
Figure 8:
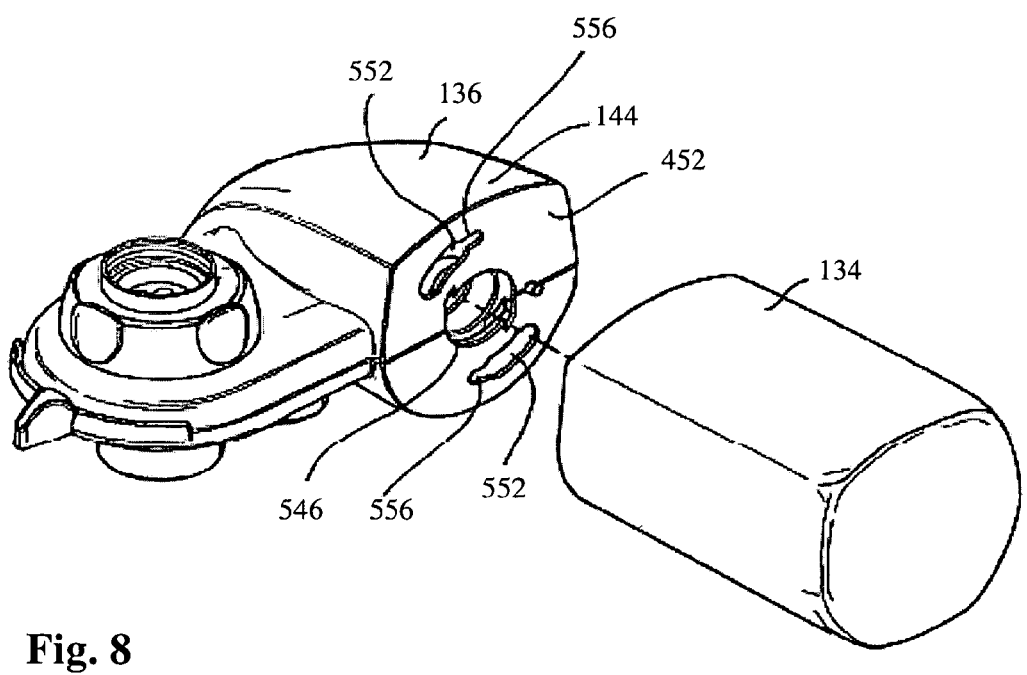
FIG. 8 is an isometric view of the end-of-faucet filter FIG. 7 showing a filter cartridge separated from a header assembly.
Figure 9E:
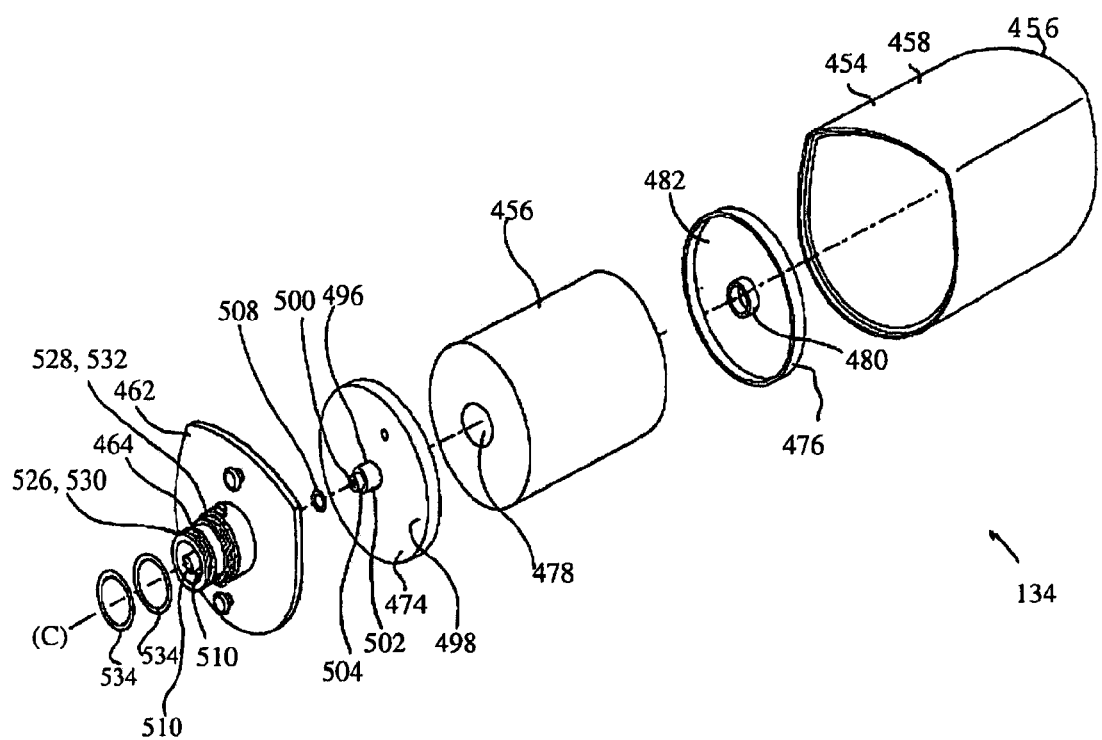
Figure 15:
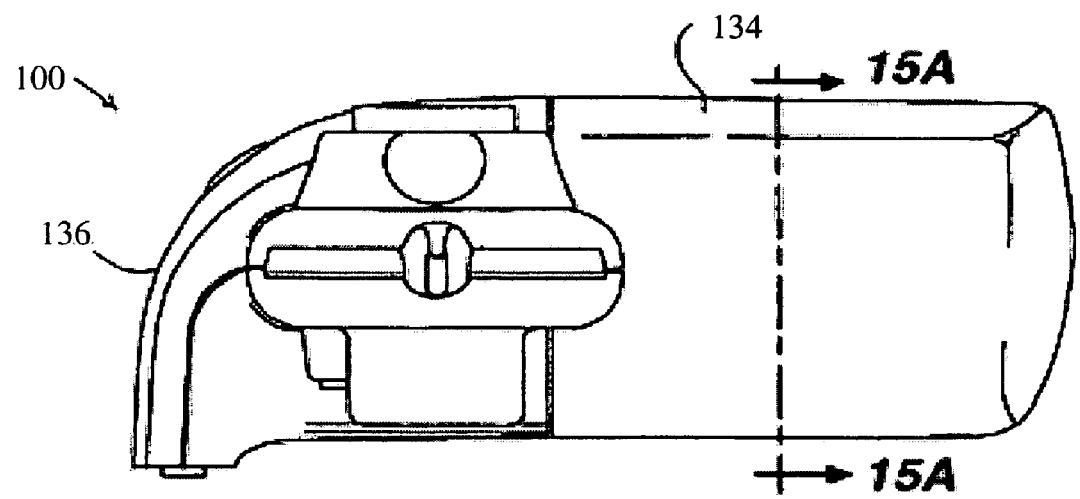
FIG. 15 is a right side view of the end-of-faucet filter shown in FIG. 1.
Figure 15A:
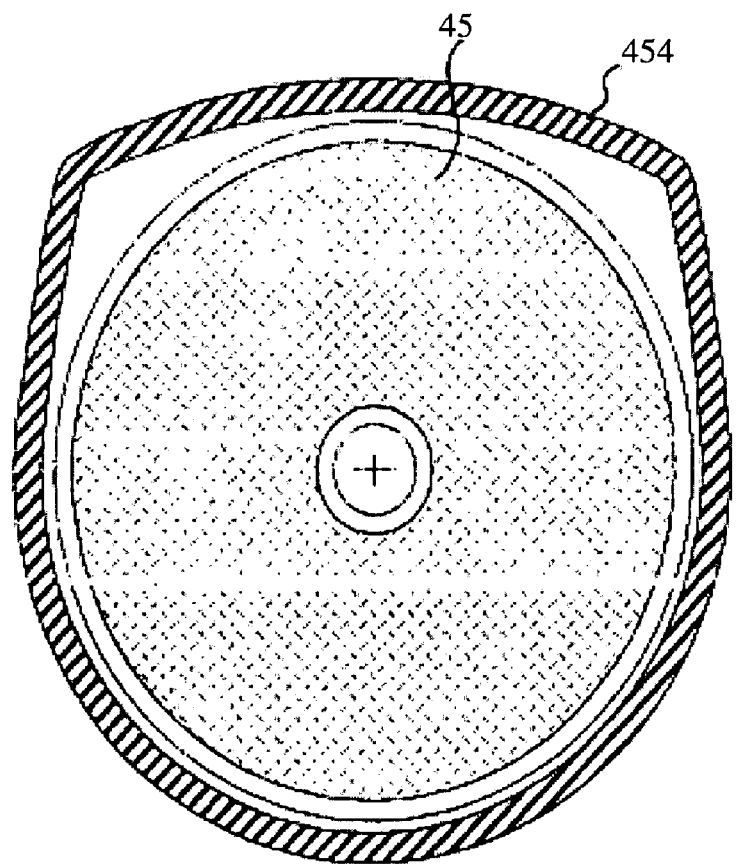
FIG. 15A is a cross-sectional view of end-of-faucet filter depicted in FIG. 15, taken along line 15A-15A.

As shown in FIGS. 6 and 8, the filter cartridge assembly 134 removably connects with a back side 452 of the filter attachment portion 144 of the header assembly 136. As previously mentioned, the filter cartridge assembly is both mechanically and fluidly coupled with the header assembly. Referring to FIG. 9E, the filter cartridge assembly 134 includes a filter housing 454 formed with a base wall 456 and integral side walls 458. The filter housing envelopes a filter material block 456 or filter element. It is to be appreciated that the filter material block 456 can be constructed from various materials, such as charcoal or other standard carbon-based material. Other water filter elements can also be used. As shown in FIGS. 9E and 15A, the filter material block 456 is generally cylindrical, while a cross-section of the elongated filter housing 454 is generally shield-shaped (i.e., a U-shaped bottom with a flattened arc top). The diameter of the filter material block is smaller than the interior diameters of the filter housing such that the filter material block is spaced apart from the interior of the filter housing. A similarly shield-shaped filter housing cap 462 is adapted to engage the front end of the filter housing 454 to seal the filter material block 456 within the filter housing. It is to be appreciated that the filter housing cap 462 can be connected with the filter housing 454 in various ways to create a water-tight seal within the filter housing. For example, in one embodiment of the present invention, the filter housing cap is ultrasonically welded to the filter housing. As shown in FIGS. 9E and 14A, the filter housing cap 462 includes a filter housing nipple 464 formed thereon. An internal flange 466 is formed within the filter housing nipple 464 that separates a rear chamber 468 from a front chamber 470. As discussed in more detail below, the internal flange 466 also defines a central aperture 472 that provides fluid communication between the front chamber 470 and the filter block material 456.

Figure 16B:
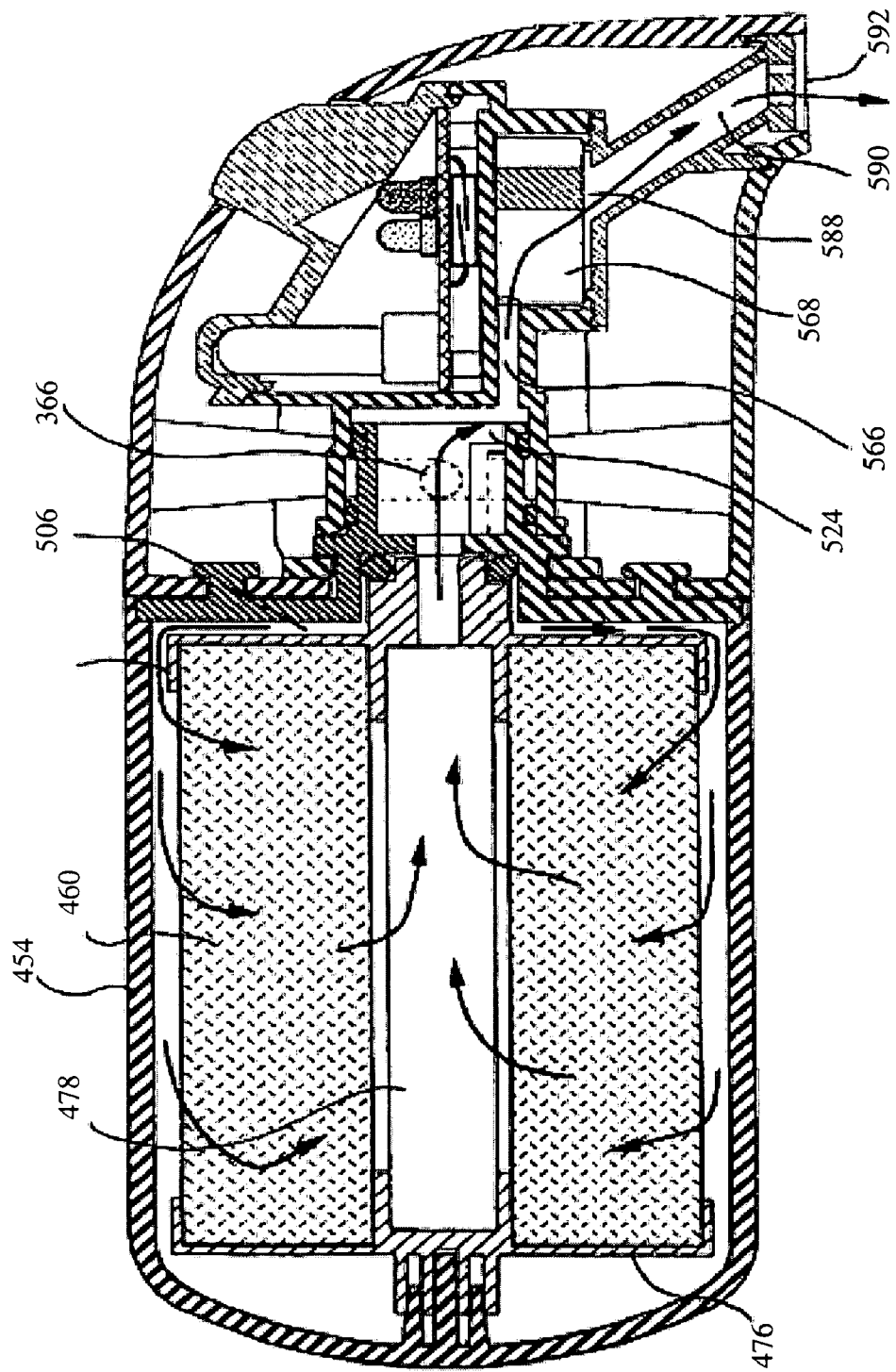
FIG. 16B is a cross-sectional view of end-of-faucet filter depicted in FIG. 16, taken along line 16B-16B.

As shown in FIGS. 9E and 16B, the filter material block 460 is connected with and held between a front filter cap 474 and a rear filter cap 476 inside the filter housing 454. The filter block material 460 defines a hollow cylindrical core 478 extending concentrically with the axis of the filter block material. The rear filter cap 476 is formed with a front center post 480 extending from a front side 482 and a rear center post 484 extending from a rear side 486. The front center post 480 of the rear filter cap 476 is adapted to fit inside the cylindrical core 478 of the filter material block 460. The rear center post of the rear filter cap 476 defines a recess 488 for engagement with a finger member 490 extending from the interior surface of the base wall 456 of the filter housing 454. The interface between the finger member and the rear center post on the rear filter cap helps to hold the filter block material in axial alignment within the filter housing.

It is to be appreciated that embodiments of the present invention include a relatively compact filter material block or filter element and filter cartridge assembly. For example, one embodiment of the filter cartridge assembly occupies no more than 6.88 cubic inches of volume, including the void space defined within the filter element. As previously mentioned, the filter material block is generally cylindrical, and in one embodiment, the filter element alone has a diameter of approximately 1.91 inches and a length of 2.40 inches, again including the void space. In addition, other embodiments include a solid the filter element, rather than having a hollow cylindrical core extending along its length. Further, other embodiments of the present invention include a relatively compact combination of filter element and filter end caps. For example, in the embodiment, the combination of filter element and end caps yields a diameter of approximately 2.00 inches and a length of approximately 3.35 inches, for an overall volume of approximately 10.52 cubic inches, including the interior void space formed in the filter element.

As shown in FIGS. 6-6D, 9E, 14A, and 16B, the front filter cap 474 is formed with a front center post 492 extending from a rear side 494. The front center post 492 on the front filter cap is adapted to fit inside the cylindrical core 478 of the filter material block 460. A filter cap outlet nipple 496 extends from a front side 498 of the front filter cap 474 and defines a filter cap outlet lumen 500, which is in fluid communication with the cylindrical core 478 of the filter material block 460. A side wall 502 of the filter cap outlet nipple 496 thins at a front end while the diameter of the filter cap outlet lumen remains constant, thereby forming an annular shelf 504 about the front end of the filter cap outlet lumen 500. The filter cap outlet nipple 496 is adapted to be received within the rear chamber 468 of the filter housing nipple 464 formed on the filter housing cap 462. The interface between the filter cap outlet nipple 496 and the rear chamber 468 of the filter housing nipple 464 also helps to hold the filter material block 460 in axial alignment within the filter housing. The length of the filter cap outlet nipple 496 is slightly greater than the depth of the rear chamber 468, thereby providing a small separation distance 506 between the front filter cap 474 and the filter housing cap 462. An O-ring 508 positioned on the annular shelf 504 of the filter cap outlet nipple 496 has a slightly larger diameter than the internal diameter of the rear chamber 468 of the filter housing nipple 464, thereby creating a water-tight seal between the filter housing nipple and the filter cap outlet nipple.

As shown in FIGS. 6-6D, 14A and 14B, the internal flange formed within the filter housing nipple 464 that separates the rear chamber 468 from the front chamber 470 is axially aligned with the filter cap outlet lumen 500 and provides fluid communication between the front chamber 470 and the cylindrical core 478 of the filter material block 460. Two conduits 510 are further formed within the filter housing nipple 464. More particularly, the conduits 510 are integrally formed with the filter housing cap 462 and filter housing nipple 464, and defined by partial cylindrical walls 512 closed by the interior surfaces of the filter housing nipple 464. Two forward apertures 514 in a side wall 516 of the filter housing nipple 464 are in fluid communication with front end portions 518 of the conduits 510. From the front end portions 518, the conduits 510 extend through the internal flange 466, and terminate in rear aperture openings on a rear side 522 of the filter housing cap 462. It is to be appreciated that other embodiments of the present invention include more or less than two conduits that can be located in any position around the circumference of the internal wall of the filter housing nipple.

As shown in FIGS. 6, 8, and 16B, the filter cartridge assembly is engaged with the header assembly 136 by inserting the filter housing nipple 464 into a filter cup 524 formed in the manifold 156. A forward pair of circumferential flanges 526 and a rear pair of circumferential flanges 528 are formed on the exterior sidewall 516 of the filter housing nipple and define forward 530 and rearward 532 channels adapted to retain O-rings 534. As discussed in more detail below, the O-rings create a water-tight seal between a side wall 536 of the filter cup 524 and the filter housing nipple 464. The forward channel 530 is located forward of the forward apertures 514 in the filter housing nipple, and the rearward channel 532 is located rearward of the sidewall apertures 514 in the filter housing nipple.

As shown in FIGS. 6 and 8, two button posts 538 and bayonet posts 540 on the filter cartridge assembly 134 engage the header assembly 136 to hold the filter cartridge assembly in position relative to the header assembly. More particularly, the two bayonet posts 540 extend radially from the sidewall 516 of the filter housing nipple 464 rearward of the rearward channel 532, and the two button posts 538 extend from a front side 542 of the filter housing cap 462 spaced apart from the filter housing nipple. As shown in FIG. 8, symmetrical, semi-circular cut-outs 544 in the upper housing 148 and lower housing 150 of the header assembly 136 form an aperture 546 in the housing in alignment with the filter cup 524, thereby allowing the filter housing nipple to pass through the housing and into the filter cup. Referring to FIGS. 10A and 10B, two bayonet clips 548 are formed on a rearward rim 550 of the filter cup 524 for engagement with the bayonet posts 540 on the filter housing nipple 464. Similarly, an arcuate button slot 552 is formed within each of the upper housing 148 and the lower housing 150 in a position aligned with and for engagement by each of the button posts 538 protruding from the filter housing cap.

In order to attach the filter cartridge assembly 134 to the header assembly 136, the bayonet posts 540 are aligned with the bayonet clips 548 and the button posts 538 are aligned with the button slots 552, as shown in FIGS. 6 and 8. The filter housing nipple 464 is inserted into the filter cup 524, such that the button posts are received within the button slots. The filter cartridge assembly 134 is then rotated with respect to the filter header assembly 136, and the bayonet posts 540 are received within the bayonet clips 548. The bayonet posts are also retained within respective clip recesses 554 shown in FIG. 14B, and the button posts 538 are retained within a narrowed portion 556 of the button slots 552 shown in FIG. 16B. The combination of the button and bayonet fittings provide secure mechanical engagement between the filter cartridge assembly and the filter header assembly. The mechanical engagement further provides a method of removing and installing the filter cartridge assembly that requires a user to simply twist the filter cartridge assembly in the appropriate direction to either engage or disengage the filter cartridge assembly from the header assembly. It is to be appreciated that the present invention need not include both bayonet and button posts. For example, other embodiments of the present invention require only button posts to connect the filter cartridge assembly with the header assembly, without the use of bayonet posts. Still other embodiments only require bayonet posts without the use of button posts.

As shown in FIGS. 6-6D, 10B, and 14A the filter duct 366 extends from the second manifold chamber 258 in the header assembly 136 to the filter cup 524. More particularly, the filter duct 366 opens into the side wall 536 of the filter cup 524 through a filter port 558. When the filter housing nipple 464 is inserted into the filter cup 524, the O-rings 534 on the filter housing nipple 464 are positioned on either side of the filter port 538 as shown in FIG. 14A. The O-rings 534 also have a diameter that is slightly larger than the inner diameter of the filter cup 524, which creates a water-tight seal between the side wall of the filter cup and the filter housing nipple. An area bounded by the O-rings 534, the sidewall of the filter cup 524, and the filter housing nipple 464 functions as a fluid transfer channel 560 to communicate water from the filter port 558 to the conduits 510 in the filter housing nipple through the forward apertures 514 in the sidewall of the filter housing nipple. In this manner a fluid communication path is formed between the filter duct 366, the filter port 558, the fluid transfer channel 560, the forward apertures 514 in the filter housing nipple, the conduits 510, and the filter cartridge assembly 134.

As shown in FIGS. 10C and 16B, a second aperture 562 is provided in a base 564 of the filter cup 524 that extends to form a counter turbine duct 566, which provides fluid communication between the filter cup 524 and a counter turbine chamber 568 in the manifold 156, which houses a counter turbine 570 therein. The counter turbine 570 includes a plurality of blades 572 extending radially from a central hub 574, which defines an aperture 576 adapted to receive a turbine spindle 578 extending downward from a ceiling 580 of the counter turbine chamber 568. As such, the central hub is seated on the counter turbine spindle, which provides an axis about which the counter turbine rotates. A counter turbine cap 582 seats against a ledge 584 in the sidewall around the bottom perimeter of the counter turbine chamber to seal the counter turbine chamber 568 and to retain the counter turbine therein. It is to be appreciated that the counter turbine cap can be connected with the counter turbine chamber in various ways. For example, in one embodiment, the counter turbine cap is ultrasonically welded to the ledge of the counter turbine chamber to create a water-tight seal between the two.

As shown in FIG. 16B, water flows from the filter cartridge assembly 134 through the central aperture 472 in the filter housing nipple 464 and into the filter cup 524. From the filter cup 524, the water flows the through the counter turbine duct 566 and enters the counter turbine chamber 568 through a counter turbine port 586. The counter turbine port 586 is positioned to emit the flow of water from the counter turbine duct 566 against the counter turbine blades 572 in a direction generally tangential to the circumference of the counter turbine 570, thereby causing the counter turbine to rotate within the counter turbine chamber. As shown in FIG. 16B, water exits the counter turbine chamber 568 through a counter turbine outlet port 588. The counter turbine outlet port 588, in turn, is connected with a filtered water outlet shaft 590. A lower end portion of the filtered water outlet shaft forms a filtered water outlet 592 with a plurality of apertures 594 through which filtered water ultimately exits the third outlet 130 of the end-of-faucet filter 100. An outlet shroud 596 is also provided in the form of a wide, oblong flange in order to cover an outlet opening 598 in the housing 140.

Some embodiments of the present invention may include the ability to alert a user to a need to change a filter due to the filter's expiration or pending expiration. A microprocessor or microcontroller may track and totalize a volume of liquid flow through the filter, for example, serving as a filter life monitoring system. The microprocessor may further track time between filter changes. The microprocessor may be implemented as, for example, a circuit board having a logic function.

When either or both of a flow and time threshold are exceeded, the microprocessor may alert a user to the need to change a filter. For example, the microprocessor may activate a light, audible alarm, or both to alert the user to the abnormal status requiring a filter change. The microprocessor may provide different alerts (for example, different-colored lights or different sounds) for each threshold exceeded.

In yet other embodiments, the microprocessor may provide both a warning alert and a filter change alert. For example, the microprocessor may activate a first output signal when a first threshold is exceeded. This first threshold may represent a percentage of a filter's recommended or maximum lifespan or volume flow therethrough (a "warning level"). Continuing the example, the microprocessor may activate the first output signal when the time since the filter was last changed exceeds 75% or 90% of a filter's recommended service life. Similarly, the first output signal may be activated when a filter has processed or purified 75% or 90% of the maximum flow recommended for the filter. In yet other embodiments, the first output signal may correspond to a warning level for time, a second output signal to a warning level for flow, a third output signal to a maximum filter service time or lifespan, and a fourth output signal to a maximum filter flow. The various output signals may actuate the same or different alarms, lights, sounds, and so forth ("outputs"). Although not necessary, the use of different outputs may facilitate a user's comprehension of the threshold exceeded that triggered the output signal.

The microprocessor may be operatively connected to a flow sensor affixed to a portion of the interior of the end-of-faucet filter. For example, the flow sensor may take the form of a magnet affixed to a faucet interior wall adjacent the turbine. A bar magnet may be affixed to a blade of the turbine. The flow sensor can detect the motion of the bar magnet at the turbine spins, and thus may count the number of turbine revolutions.

Each turbine revolution corresponds to an approximate liquid flow volume through the turbine. By counting and totalizing the turbine revolutions, the liquid flow volume through the turbine may be estimated. This flow estimate, in turn, may be employed by the microprocessor to determine whether any of the thresholds have been exceeded. Similarly, the flow sensor may be positioned near an inlet of the end-of-faucet filter, the filter cartridge, or an outlet of either to ensure all flow into and out of the faucet and/or filter is properly measured and estimated. The sensor may be, for example, a reed switch or hall-effect sensor.

Greater detail regarding sensing of liquid flow through the end-of-faucet filter and estimation of service time and/or filter life may be found in U.S. Pat. Nos. 5,935,426 and 6,149,801, the entireties of which are incorporated herein by reference.

Certain embodiments of the present invention can also include specific examples of the filter life monitoring described above to monitor the effectiveness of the filter's ability to filter water and to provide notice that the filter is in need of replacement.

In one example, as shown in FIG. 9B, the end-of-faucet filter 100 an operative system 600 having a circuit board 602 that provides a logic function to determine when the filter is no longer effective and to notify the user of the same. The circuit board 602 is housed inside a circuit board compartment 604 formed within the manifold 156 directly above the counter turbine chamber 568. Four circuit board pedestals 606 extend vertically from a base 608 of the circuit board compartment 604 to support the circuit board. The circuit board pedestals 606 provide a separation distance between the circuit board and the base of the circuit board chamber to provide clearance for components mounted to the bottom of the circuit board. A translucent cover 610 seats on top of the circuit board compartment.

The circuit board 602 includes a reed switch or other switching device that is activated by a magnetic field generated by the counter turbine rotating in the counter turbine chamber beneath the circuit board compartment. It is to be appreciated that the counter turbine 570 can be configured in various ways in order to generate the magnetic filed. For example, in one embodiment, the counter turbine is composed of a magnetized ceramic material. In another embodiment, a bar magnet is inserted into the end of one or more of the turbine blades. In such a configuration, a north pole magnet can be placed in one blade on the counter turbine while a south pole magnet can be placed in an opposing blade. The reed switch counts the number of rotations of the counter turbine as determined from the magnetic field and transmits the number of rotations to a processor on the circuit board. The processor translates the rotational information into a running total volume figure that corresponds with the volume of water that has passed through the filter. A processor compares the total volume figure with a maximum volume flow that corresponds the efficacy of the filter to determine if the filter is in need of replacement.

In one specific embodiment, the processor is adapted to actuate one or both of two light emitting diodes (LEDs), a green LED 612 and a red LED 614, mounted on the circuit board 602 shown in FIG. 9B. An LED aperture 616 in the upper housing 148 accommodates a projection 618 from the translucent cap 610 that provides a window 620 into the circuit board compartment 604. When actuated, light from the green LED and red LED passes through the projection window to communicate certain information to the user. For example, when a unit volume is calculated, the processor actuates the green LED for a short duration to indicate to the user that the filter life indicator is working. Generally the green LED will flash on and off several times while filtered water is dispensed through the end-of-faucet filter. For example, when filling a glass with water, the green LED indicates with each flash that a unit volume mark is recorded. It is to be appreciated that the present invention can be configured to light the LEDs for different durations so as to conserve power.

In another scenario, when the filter is nearing the end of its efficacy based upon the present maximum volume flow amount, the processor will activate the red LED in conjunction with the green LED at the unit volume marks. The combination of the red LED and green LED results in an amber colored flashing light that warns a user that it is time to replace the filter cartridge assembly. This efficacy warning may be programmed to occur, for example, when 90-95 percent of the maximum volume flow amount is reached.

In yet another scenario, when the maximum volume flow amount is calculated, the processor will activate only the red LED when water flowing from the filter cartridge assembly rotates the counter turbine. The red LED will shine constantly during the water flow to indicate that the filter material block is no longer effective and that the filter cartridge assembly needs to be replaced. Alternately, once the maximum flow volume amount is reached, the processor may actuate the red LED constantly, even when there is no water flow through the counter turbine chamber to indicate to the user that the filter cartridge assembly needs replacing regardless of the operational mode of the end-of-faucet filter chosen by the user. It should be noted alternate embodiments may light one or both LEDs. Further, instead of constantly illuminating the LED(s), other embodiments light the LED(s) intermittently to save power.

The filter life monitor system 600 can also include a button or a pin that engages the circuit board indicating to the processor that the filter cartridge assembly has been removed and/or replaced. For example, as shown in FIGS. 9B and 14A, the end-of-faucet filter 100 includes a reset pin 622 housed in a reset pin shaft 624 formed in the manifold 156 that extends rearward out of the reset pin shaft 624 and through an aperture 626 in the housing 140 to expose an end portion 628 of the reset pin. A rear flange 630 and a front flange 632 are formed on a rearward end portion 634 defining a channel 636 therebetween adapted to retain an O-ring 638 about the reset pin 622. The O-ring 638 has a slightly larger diameter than diameter of the interior of the reset pin shaft 624 and provides frictional engagement with the sidewall of the reset pin shaft to prevent the reset pin from accidentally slipping out of the shaft. The engagement between the O-ring 638 and the reset pin shaft 624 also acts to create a seal to keep moisture from entering the circuit board compartment 604. A front end portion 640 of the reset pin 622 extends from the reset pin shaft 624 into the circuit board compartment 604 where it engages a reset switch 642 on the circuit board 602. When the filter cartridge assembly 134 is disengaged from the header assembly 136, a reset pin spring 644, within the reset pin shaft 624, through which the reset pin 622 extends, expands in its axial direction of bias to push against the front flange 632, thereby extending the rear end portion 634 of the reset pin outside the housing 140. The reset pin spring also engages a ledge 646 in a front end portion 648 of the reset pin shaft 624 where the diameter of the reset pin shaft narrows, thereby providing an opposing force to axial movement of the reset pin spring toward the front of the reset pin shaft. When the reset spring forces the reset pin rearward, the front end portion 640 of the reset pin 622 releases the reset switch 642 on the circuit board 602 indicating to the processor that the filter cartridge assembly 134 has been removed.

When a replacement filter cartridge assembly is attached to the header assembly, the reset pin 622 is pushed forward by the filter housing cap 462, compressing the reset pin spring 644. The front end portion 640 of the reset pin 622 actuates the reset switch 642 on the circuit board 602, causing the processor to clear the previous flow volume total and begin recording new flow volume units toward the maximum flow volume amount. Some embodiments of the present invention also include an additional feature wherein the reset switch can also be used to reset the entire processor if for some reason the logic values stored in the processor become corrupted and the processor malfunctions. For example, reset of the entire processor can be accomplished by pushing the reset switch to a second position further forward than the position of the reset switch when engaged by the reset pin when engaged with the filter housing cap. In such an instance, a user may use, for example, a pencil to push the rear end of the reset pin further into the reset pin shaft than its normal position when engaged with the filter housing cap. This will in turn push the reset switch to the second position and reset the entire processor.

As previously mentioned, the end-of-faucet filter of the present invention operates in three modes to provide aerated water, a pulsed jet spray, and filtered water. The operation of each of these modes are described below with respect to the structure of the end-of-faucet filter described above.

Figure 17:
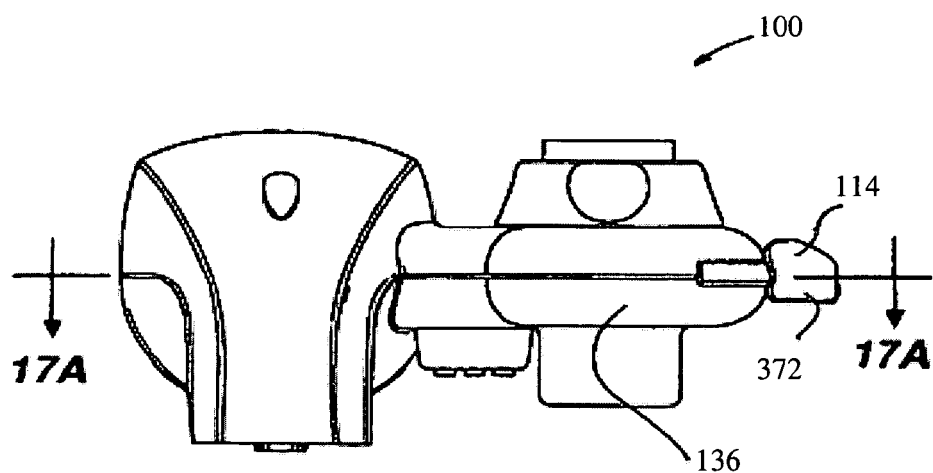
FIG. 17 is a front view of the end-of-faucet filter shown in FIG. 1.
Figure 17A:
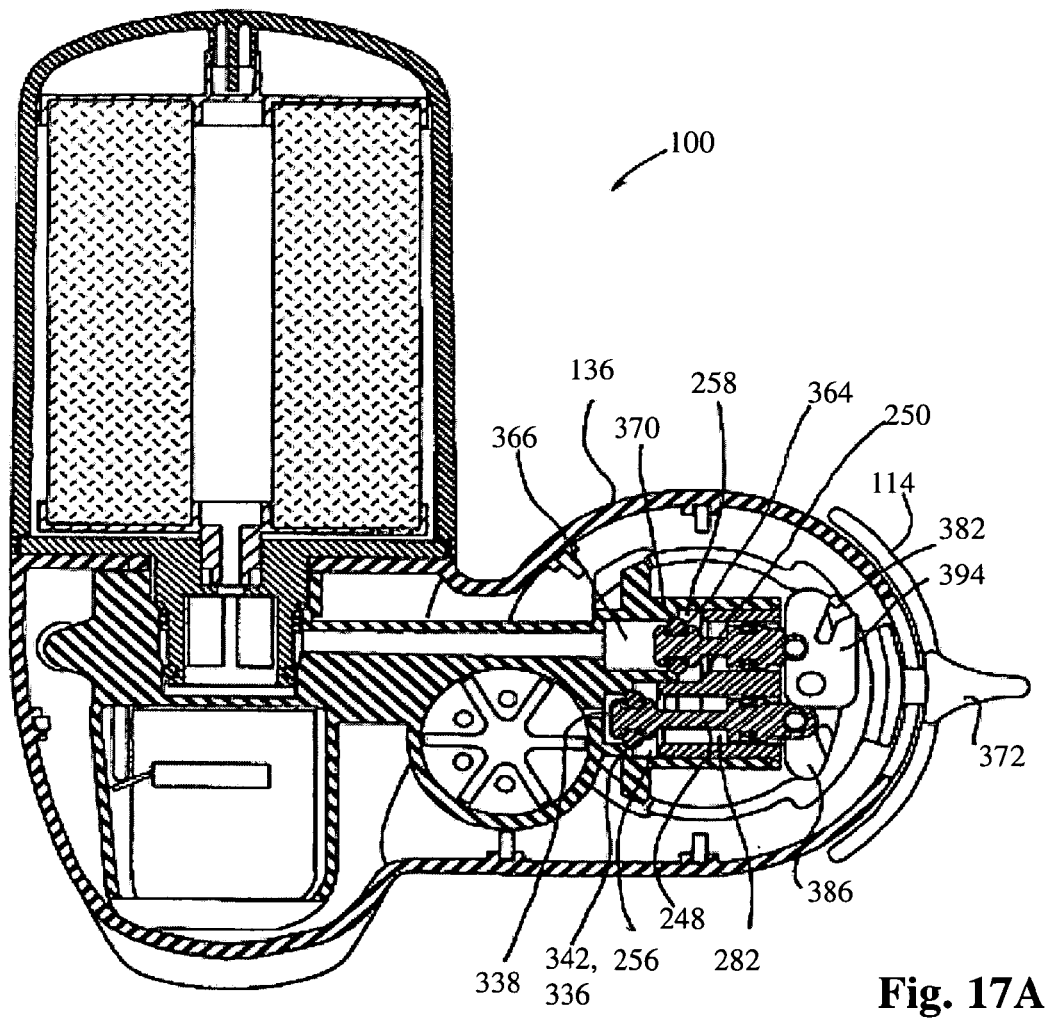
FIG. 17A is a cross-sectional view of end-of-faucet filter depicted in FIG. 17, taken along line 17A-17A.
Figure 18:
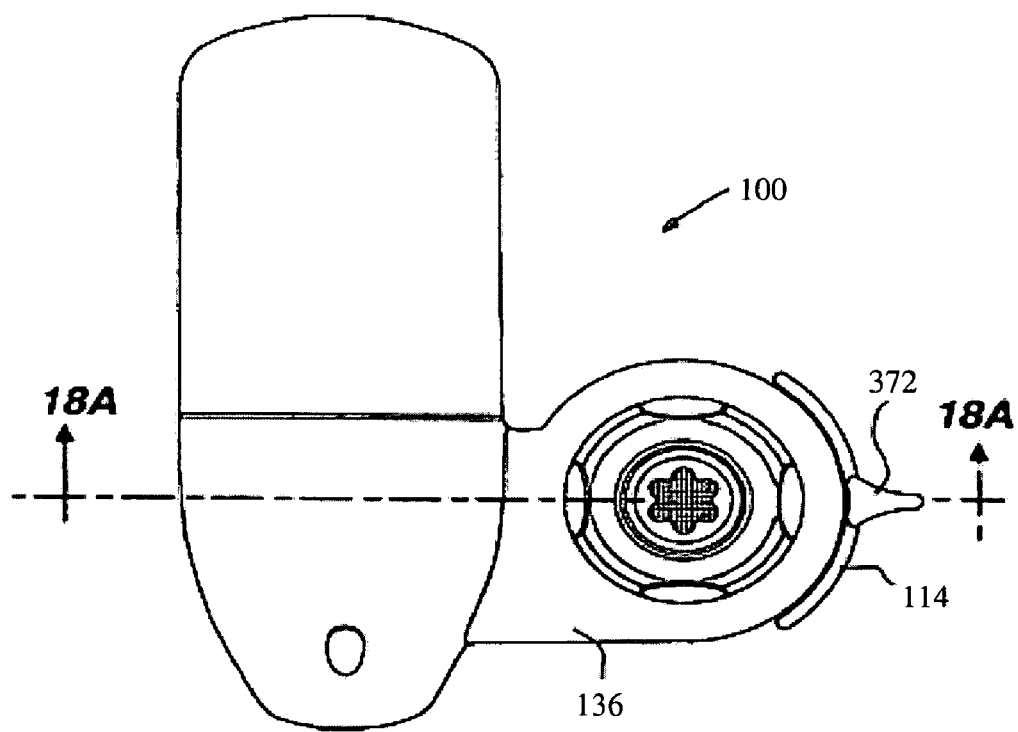
FIG. 18 is a top view of the end-of-faucet filter shown in FIG. 1.
Figure 18A:
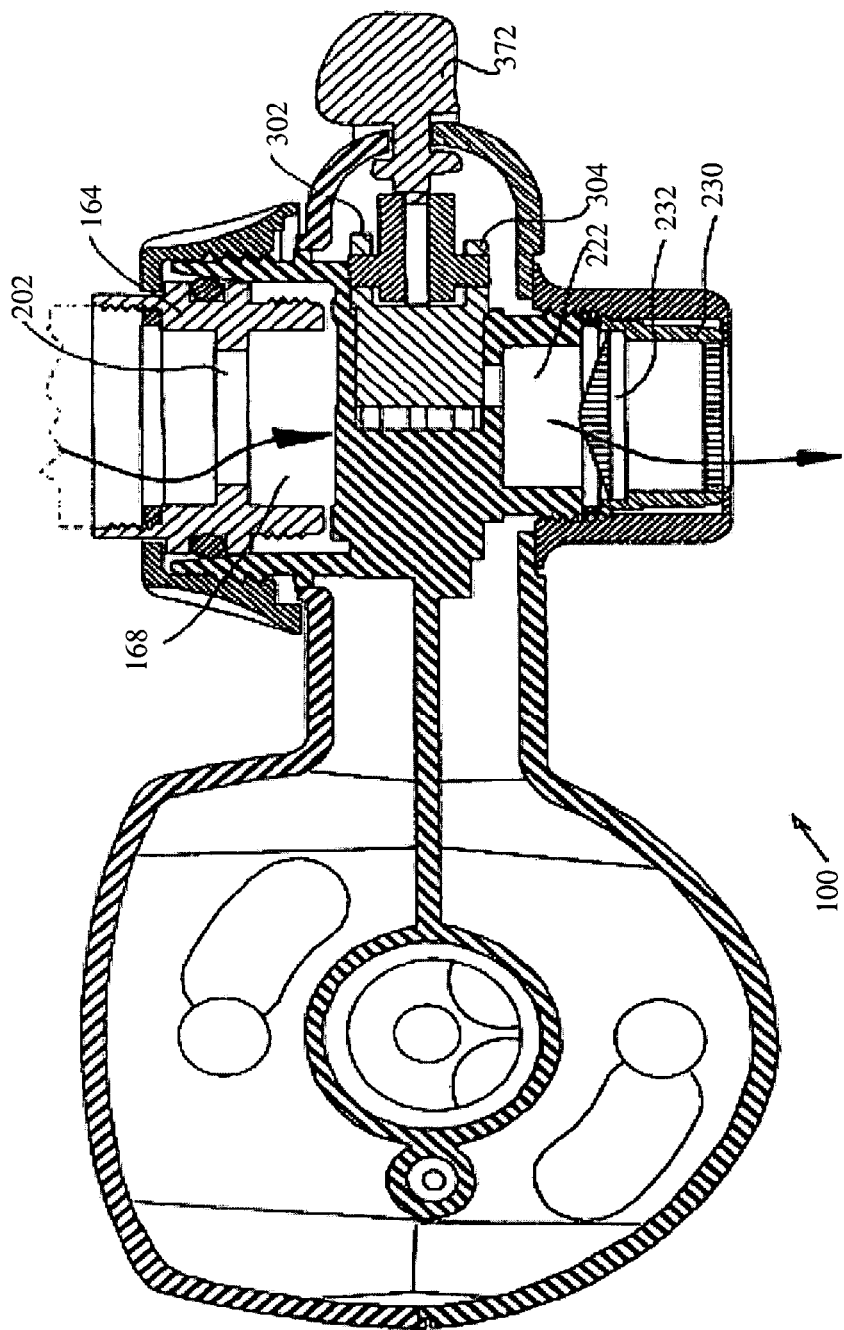
FIG. 18A is a cross-sectional view of end-of-faucet filter depicted in FIG. 18, taken along line 18A-18A.

The standard operation of the end-of-faucet filter of the embodiment described above is in aeration mode. In addition, the end-of-faucet filter is configured such that if it is operated in either jet spray mode or filter mode, the end-of-faucet filter will automatically return to aeration mode after the water flow from the faucet is stopped. As shown in FIGS. 17-18A, when the end-of-faucet filter 100 is in the aeration mode, the finger grip 372 of the actuator switch 114 is centered on the right side of the header assembly 136 and is aligned with the upper valve tab 302 and the lower valve tab 304. In this position, neither the jet cam 386 nor the filter cam 394 is engaged by the jet cam pin 386 or filter cam pin 382, respectively. As shown in FIG. 17A, the O-ring 336 on the jet valve 248 in the first manifold chamber 256 is seated against the angled mating surface 342 on the jet duct 338 in the first manifold chamber, and the O-ring 364 on the filter valve 250 in the second manifold chamber 258 is seated against the angled mating surface 370 on the filter duct 366. In this configuration, flow into either the jet duct or the filter duct is restricted.

Referring to FIGS. 10C-10E, 12A-12E, and 17-18A, when the end-of-faucet filter 100 is in the aeration mode, water exits the faucet and flows into the nipple 164, through the lobed aperture 202, and into the inlet cup 168. Water then flows from the inlet cup through the inlet port 254 and into the first manifold chamber 256. Because the O-ring 336 on the jet valve 248 is seated against the jet duct 338, as shown in FIG. 17A, water flow is directed into the jet valve lumen 282, which places pressure on the cup seal 328 therein to create a water-tight seal in the right end portion of the jet valve lumen in the valve body 252. From the jet valve lumen 282, the water flows through the jet valve port 288 and into the second manifold chamber 258. Because the O-ring 364 on the filter valve 250 is seated against the filter duct 366, water flow is directed into the filter valve lumen 284, which places pressure on the cup seal 356 therein to create a water-tight seal in the right end portion of the filter valve lumen in the valve body. From the filter valve lumen 284, the water flows through the filter valve port 289 in the valve body 252, through the aerator port 291 in the manifold 156, and exits into the area bounded by the outlet fitting 222. The water continues its flow through the aerator 232 and exits the end-of-faucet filter through the outlet cup 230.

As mentioned above, the end-of-faucet filter 100 of the present invention can also operate in the jet spray mode. To place the end-of-faucet filter in the jet spray mode, the finger grip 372 of the actuator switch 114 is moved toward the rear of the header assembly 136, as shown in FIGS. 13-13A. Movement of the finger grip is translated through the actuator bridge 376 to the snap collar 380. In turn, the snap collar rotates counter-clockwise (as viewed from the top) around the inlet cup 168. Both the jet cam Pin 386 and the filter cam Pin 382 move with the snap collar. As the snap collar moves, the jet cam pin 386 engages the pin slot 402 in the jet cam 392 and causes the jet cam to rotate about the actuator pin 426. The rotation of the jet cam translates into movement of the jet cam peg 412, which is engaged with the aperture 322 in the jet valve tab 318. The rotation of the jet cam thereby pulls the jet valve 248 rightward through the jet valve lumen 282 in the valve body 252 until the O-ring 336 on the jet valve in the first manifold chamber 256 presses against the angled mating surface 294 on the jet valve lumen 282 in the valve body, creating a water-tight seal therewith. The rotation of the jet cam peg also forces the lower wire end 424 of the actuator spring 418 to rotate in contraction against its bias, which tends to force the jet cam back to its original position. However, the pressure of the water on the jet valve as it flows through the first manifold chamber acts to hold the jet valve in position against jet valve lumen, and thus maintains the actuator spring in its contracted position.

In contrast to the jet cam 392, as shown in FIG. 13A, the filter cam 394 is not engaged by the filter cam pin 318 when the snap collar 380 is rotated counter-clockwise (as viewed from the top). Instead the filter cam pin 318 slides away from the pin slot 402 in the filter cam and the filter cam does not rotate. This means that the O-ring 364 on the filter valve 250 in the second manifold chamber 258 remains seated against the angled mating surface 370 on the filter duct 366. In this configuration, flow into the filter duct remains restricted. Further, as discussed below, because the O-ring 336 on the jet valve 248 is seated against the opening to the jet valve lumen 282 in the valve body, no water will reach the second manifold chamber.

As shown in FIGS. 10C-10E, 12A-12E, 13A, and 16A, when the end-of-faucet filter 100 is in the jet spray mode, water exits the faucet and flows into the nipple, through the lobed aperture, and into the inlet cup. From the inlet cup 168, the water flows through the inlet port 254 and into the first manifold chamber 256. Because the O-ring 336 on the jet valve 248 is seated against the jet valve lumen 282 in the valve body, water flow is directed into the jet duct 338. Water flows through the jet duct and enters the pulse turbine chamber 428 through the pulse turbine port 430. The water then engages the blades 438 of the pulse turbine 436 causing it to rotate. At any given time the web 450 on the bottom face of the pulse turbine occludes or partially occludes two or more of the jet outlet apertures 446 in the pulse turbine cover 432, which creates a pulsating output on a rotating basis amongst the jet nozzles 448. The water exits the pulse turbine chamber through the jet outlet apertures not covered by the web and streams down the jet nozzles. The water flow ultimately exits the end-of-faucet filter through the apertures in the jet nozzle outlet cover.

When the water flow is turned off at the faucet, the actuator spring 418 that has been tensioned by the movement of the jet cam peg 412 imparts a resolving force on the jet cam peg, which is translated to the jet valve 248. With no water pressure maintaining an opposing force on the left end portion of the jet valve, the spring bias pushes the jet cam peg, moving the jet valve leftward in the jet valve lumen 282 to return the O-ring 336 on the jet valve to a position seated against the jet duct 338, as shown in FIG. 17A. At the same time, the spring bias force on the jet cam peg rotates the jet cam back to its original position, moving the jet cam pin 386 within the pin slot 402, thereby rotating the snap collar 380 and actuator switch 114 to their original positions in the aeration mode. The cup seal 328 located within the jet valve lumen allows the actuator spring to more easily return the jet valve to its original position in the aeration mode, because the resistance to movement of the jet valve in the valve body without water pressure is greatly reduced.

As mentioned above, the end-of-faucet filter of the present invention can also operate in the filter mode. To place the end-of-faucet filter in the filter mode, the finger grip 372 of the actuator switch 114 is moved forward about the header assembly 136, as shown in FIGS. 14-14B. Movement of the finger grip is translated through the actuator bridge 376 to the snap collar 380. In turn, the snap collar rotates clockwise (as viewed from the top) around the inlet cup 168. Both the jet cam pin 386 and the filter cam pin 382 move along with the snap collar. As the snap collar moves, the filter cam pin engages the pin slot 402 in the filter cam 394 and causes the filter cam to rotate about the actuator pin 426. The rotation of the filter cam translates into movement of the filter cam peg 414, which is engaged with the aperture 350 in the filter valve tab 346. The rotation of the filter cam thereby pulls the filter valve 250 rightward through the filter valve lumen 284 in the valve body 252 until the O-ring 364 on the filter valve in the second manifold chamber 258 presses against the angled mating surface 296 on the filter valve lumen 274 in the valve body, creating a water-tight seal therewith. The rotation of the filter cam peg also forces the upper wire end 422 of the actuator spring 418 to rotate in contraction against its bias, which tends to force the filter cam back to its original position. However, the pressure of the water on the filter valve as it flows through the second manifold chamber acts to hold the filter valve in position against filter valve lumen, and thus maintains the actuator spring in its contracted position.

In contrast to the filter cam 394, as shown in FIG. 14A, the jet cam 392 is not engaged by the jet cam pin 386 when the snap collar 380 is rotated clockwise. Instead the jet cam pin slides away from the pin slot 402 in the jet cam 392 and the jet cam does not rotate. As such, the O-ring 336 on the jet valve in the first manifold chamber 256 remains seated against the angled mating surface 342 on the jet duct 338. In this configuration, flow into the jet duct remains restricted. Because the O-ring on the jet valve is seated against the jet duct, water flow is directed into the jet valve lumen 282, which places pressure on the cup seal 382 therein to create a water-tight seal in the right end portion of the jet valve lumen in the valve body. From the jet valve lumen, the water flows through the jet valve port 288 and into the second manifold chamber 258. Because the O-ring 364 on the filter valve 250 is seated against the angled mating surface 296 on the filter valve lumen 284, water flow will be directed out of the second manifold chamber 258 and into the filter duct.

As shown in FIGS. 10B-10E, 12A-12E, 14A, and 16B, when the end-of-faucet filter is in the filter mode, water exits the faucet and flows into the nipple 164, through the lobed aperture 202, and into the inlet cup 168. From the inlet cup, the water flows through the inlet port 254 and into the first manifold chamber 256. Because the O-ring 336 on the jet valve 248 in the first manifold chamber 256 is seated against the opening to the jet duct 338, water flow is directed into the jet valve lumen 282 in the valve body. The water pressure on the cup seal 328 about the jet valve creates a water-tight seal between the jet valve and the jet valve lumen. From the jet valve lumen, the water flows through the jet valve port 288 in the valve body and into the second manifold chamber 258. Because the O-ring 364 on the filter valve 250 is seated against the filter valve lumen 344, the water flow is directed out of the second manifold chamber 258 and into the filter duct 366.

As shown in FIGS. 14A and 14B, the water exits the filter duct 366 and enters the fluid transfer channel 560 between the two O-rings 534 on the filter housing nipple 464. From the fluid transfer channel, the water enters the forward apertures 514 on the filter housing nipple between the two O-rings and continues through the conduits 510 running along the interior sidewall of the filter housing nipple. The water exits the conduits through rear apertures 520 in the filter housing cap 462. The water flow exiting the filter housing cap impacts the front filter cap 474 and is dispersed radially in the space 506 between the filter housing cap and the front filter cap. The water then enters the interior of the filter housing 454 from around the front filter cap 474 and fills the filter housing, surrounding the filter material block 460. Water then diffuses radially through the filter material block to become filtered water. The filtered water collects within the hollow cylindrical core 478 of the filter material block and drains from within the filter housing through the filter outlet cap nipple 496. The filtered water then flows out of the filter outlet cap nipple into the filter housing nipple 464 in the opposite direction of the flow of water through the adjacent conduits 510 in the filter housing nipple.

As shown in FIG. 16B, the filtered water flowing through the filter housing nipple 464 then enters the filter cup 524 and exits through the counter turbine duct 566 in the base of the filter cup. The filtered water then flows through counter turbine duct 566 and into the counter turbine chamber 568 where it tangentially impacts the counter turbine blades 572 causing the counter turbine 570 to rotate in a clockwise direction (as viewed from the top). As discussed above, the end-of-faucet filter can also include a circuit board 602 that monitors the rotating turbine to keep track of the total volume of water that has passed through the filter. The filtered water then exits the counter turbine chamber, through the counter turbine outlet port 588, and through the filtered water outlet shaft 590. From the filtered water outlet shaft, the filtered water exits the end-of-faucet filter through the filtered water outlet apertures 594.

When the water flow is turned off at the faucet, the actuator spring 418 that has been tensioned by the movement of the filter cam peg 412 imparts a resolving force on the filter cam peg which is translated to the filter valve 250. With no water pressure maintaining an opposing force on the left end portion of the filter valve, the spring bias pushes the filter cam peg, moving the filter valve leftward in the filter valve lumen 284 to return the O-ring 364 on the filter valve to a position seated against the filter duct 366. At the same time, the spring bias force on the filter cam peg rotates the filter cam back to its original position, moving the filter cam pin within the pin slot, thereby rotating the snap collar 380 and actuator switch 114 to their original positions in the aeration mode, as shown in FIG. 17A. The cup seal 356 located within the filter valve lumen 284 allows the actuator spring 418 to more easily return the filter valve to its original position in the aeration mode, because the resistance to movement of the filter valve in the valve body without water pressure is greatly reduced.

It will be appreciated from the above noted description of various arrangements and embodiments of the present invention that an end-of-faucet filter has been described which has various modes of operation and which includes a filter cartridge assembly connected with a header assembly having at least one outlet. The end-of-faucet filter can be formed in various ways and operated in various manners. It will be appreciated that the features described in connection with each arrangement and embodiment of the invention are interchangeable to some degree so that many variations beyond those specifically described are possible.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed:

1. An apparatus connected to an outlet end of a faucet, comprising:
   a header assembly;
   said header assembly including means for coupling to a filter cartridge and an inlet in fluid communication with a remote source of water under pressure;
   a first header assembly outlet in fluid communication with said inlet;
   a second header assembly outlet in fluid communication with said inlet;
   said first header assembly outlet disposed in substantial axial alignment with said outlet end of said faucet so that water flowing from said inlet to said first header assembly outlet flows in a substantially straight path of travel defining an axis;
   said second header assembly outlet disposed in fluid communication with said outlet end of said faucet, said second header assembly outlet disposed laterally with respect to said first header assembly outlet so that water flowing from said inlet to said second header assembly outlet flows in a path of travel having at least one substantially ninety degree turn in a first direction;
   a manifold disposed within said header assembly;
   said manifold being in fluid communication with said inlet;
   a valve body disposed within said manifold;
   said valve body having a first, neutral position where said inlet is in open fluid communication with said first header assembly outlet and in closed fluid communication with said second header assembly outlet;
   said valve body having a second position where said inlet is in open fluid communication with said second header assembly outlet and in closed fluid communication with said first header assembly outlet;
   an actuator switch that moves circumferentially in a plane substantially perpendicular with said axis to move said valve body into said first and second positions;
   said actuator switch extending laterally with respect to said outlet end of said faucet;
   said second header assembly outlet being laterally disposed on a first side of said outlet end of said faucet and said actuator switch being laterally disposed on a second side of said outlet end of said faucet so that said first and second header assembly outlets and said valve actuator are laterally disposed with respect to one another; and
   a bias means that urges said valve body to return to said first, neutral position when said valve body is in said second position and water flowing from said remote source of water under pressure is turned off, said water flow having sufficient force to overcome said bias means when said water is flowing.

2. The apparatus of claim 1, further comprising:
   a third header assembly outlet in fluid communication with said inlet;
   said third header assembly outlet disposed in fluid communication with said outlet end of said faucet, said third header assembly outlet disposed laterally with respect to said first and second header assembly outlets so that water flowing from said inlet to said third header assembly outlet flows in a path of travel having at least one substantially ninety degree turn in said first direction;
   said valve body having a third position where said inlet is in open fluid communication with said third header assembly outlet and in closed fluid communication with said first and second header assembly outlets;
   said bias means urging said valve body to return to said first, neutral position when said valve body is in said third position and water flowing from said remote source of water under pressure is turned off.

3. The apparatus of claim 2, further comprising:
   a filter cartridge positioned in open fluid communication with said third header assembly outlet so that water flowing from said third header assembly outlet is filtered.

4. The apparatus of claim 1, further comprising:
   an aerator positioned in open fluid communication with said first header assembly outlet so that water flowing from said first header assembly outlet is aerated.

5. The apparatus of claim 1, further comprising:
   a jet spray adapter positioned in open fluid communication with said second header assembly outlet so that water flowing from said second header assembly outlet is pulsating.

* * * * *